US008303310B2

(12) United States Patent
Yoon

(10) Patent No.: US 8,303,310 B2
(45) Date of Patent: Nov. 6, 2012

(54) SYSTEM FOR EVALUATING INFORMATION COMPETENCY AND METHOD THEREOF

(75) Inventor: Chui-Young Yoon, Cheongju-si (KR)

(73) Assignee: Chungbuk National University Industry-Academic Cooperation Foundation, Cheongju-si (KR)

( * ) Notice: Subject to any disclaimer, the term of this patent is extended or adjusted under 35 U.S.C. 154(b) by 1286 days.

(21) Appl. No.: 11/948,634

(22) Filed: Nov. 30, 2007

(65) Prior Publication Data

US 2008/0227064 A1 Sep. 18, 2008

(30) Foreign Application Priority Data

Mar. 16, 2007 (KR) ........................ 10-2007-0025807

(51) Int. Cl.
*G09B 19/00* (2006.01)
*G06Q 10/00* (2006.01)

(52) U.S. Cl. .................... 434/219; 705/1.1; 705/7.38

(58) Field of Classification Search .................. 434/219; 705/1.1, 7.38
See application file for complete search history.

*Primary Examiner* — Kesha Y. Frisby
(74) *Attorney, Agent, or Firm* — Oblon, Spivak, McClelland, Maier & Neustadt, L.L.P.

(57) ABSTRACT

An information competency evaluation system and a method thereof are disclosed. The system selects an evaluation group containing an evaluation target from evaluation groups classified by business departments and business position. The system provides evaluation problems of evaluation domains to an evaluation target based on a selected evaluation group, estimates evaluation response received from a terminal of an evaluation target, and estimates EIIC by applying a weight of evaluation domains to a selected evaluation group. The system refers to a core evaluation domain according to EIIC and a selected evaluation group to determine an information competency maturity stage of an evaluation target. The system analyzes information competency of an evaluation target with EIIC and a maturity stage and by business departments and business position to provide the analysis to a terminal. The system analyzes and provides information competency with complex indicators of determining a level of information competency, and provides education information for development of an information competency of evaluation target.

11 Claims, 40 Drawing Sheets

Fig.4A

| MAJOR CHARACTERISTICS OF EACH BUSINESS DEPARTMENT | | CHARACTERISTICS IN INFORMATON PERSPECTIVE | CORE EVALUATION DOMAINS |
|---|---|---|---|
| S T R A T E G Y  P L A N | GOAL AND STRATEGY OF MANAGEMENT, PLANNING AND DRIVING PLAN, ANALYZING PERFORMANCE<br><br>- PLANNING AND DRIVING INFORMATIONIZATION, AND ANALYZING AND IMPROVING PERFORMANCE<br><br>- SUMMING UP BUSINESS FIELDS, PLANNING AND ADJUSTING, ANALYZING PROBLEM AND SUGGESTING IMPROVEMENT OF BUSINESS | - ESTABLISHMENT OF INFORMATIONIZATION PLAN AND IT TREND<br><br>- INFORMATION-RELATED RECOGNITION AND LAW/SYSTEM<br><br>- KNOWLEDGE OF INFORMATION TECHNOLOGY | - INFORMATION MIND<br><br>- KNOWLEDGE OF INFORMATION TECHNOLOGY |
| DEVELOPMENT / MAINTENANCE | - DRIVING AND PERFORMING INFORMATIONIZATION, DEVELOPING AND ACQUIRING INFORMATION SYSTEM<br><br>- MAINTENANCE OF INFORMATION SYSTEM<br><br>- EFFECTIVE MANAGEMENT AND CONTINUOUS IMPROVEMENT OF INFORMATION SYSTEM | - KNOWLEDGE OF INFORMATION TECHNOLOGY<br><br>- DEVELOPMENT AND ACQUISITION OF INFORMATION SYSTEM<br><br>- MAINTENANCE AND IMPROVEMENT OF INFORMATION SYSTEM | - KNOWLEDGE OF INFORMATION TECHNOLOGY<br><br>-CAPABILITY OF INFORMATION APPLICATION |
| BUSINESS APPLICATION | - KNOWLEDGE FOR PRINCIPAL BUSINESS PROCESSES AND RELATED FIELDS<br><br>- EFFECTIVE UTILIZATION OF IT KNOWLEDGE IN PERFORMING TASKS<br><br>- UTILIZATION OF INFORMATION SYSTEM AND SOLUTIONS, INFORAMTION COLLECTION, SHARE, AND MANAGENENT | - KNOWLEDGE OF INFORMATION TECHNOLOGY<br><br>- INFORMATION SYSTEM AND SOLUTIONS<br><br>- COLLECTION AND MANAGEMENT INFORAMTION | - KNOWLEDGE OF INFORMATION TECHNOLOGY<br><br>-CAPABILITY OF INFORMATION APPLICATION |
| ADMINISTRATION SUPPORT | - ADMINISTRATON SUPPORT FOR PERSONNEL ADMINISTRATION AND BUDGET OF ALL BUSINESS FIELDS<br><br>- UTILIZATION OF IT KNOWLEDGE, SOLUTIONS AND INFORMATION SYSTEM<br><br>- EFFICIENT SUPPORT FOR INFORMATIONIZATION IMPLEMENTATION | - INFORMATION-RELATED UNDERSTANDING AND FAMILIARITY<br><br>- INFORMATION SYSTEM AND SOLUTIONS<br><br>- INFORMATION-RELATED EDCUATION AND SUPPORT | -CAPABILITY OF INFORMATION APPLICATION<br><br>-POTENTIAL OF INFORMATION CAPABILITY |

Fig.4B

| MAJOR CHARACTERISTICS OF BUSINESS TASKS | | CHARACTERISTICS IN INFORMATION PERSPECTIVE | CORE EVALUATION DOMAINS |
|---|---|---|---|
| CEO | - FINAL DECISION FOR ENTERPRISE MANAGEMENT AND INFORMATIONIZATION<br><br>- MIND FOR ENTERPRISE MANAGEMENT AND INFORMATIONIZATION STRATEGY, SENSE OF VALUES FOR INFORMATIONIZATION, AND MANAGEMENT-RELATED KNOWLEDGE<br><br>- MANAGING DIRECTORS AND MIDDLE MANAGERS | ⇨ - ESTABLISHMENT OF INFORMATIONIZATION PLAN AND IT TREND<br><br>- ACKNOWLEDGEMENT AND ATTITUDE FOR INFORMATIONIZATION<br><br>- INFORMATION-RELATED EDUCATION/CAREER | ⇨ - INFORMATION MIND<br><br>- POTENTIAL OF INFORMATION CAPABILITY |
| DIRECTOR | - CEO'S DECISION MAKING SUPPORT<br><br>- IT-RELATED KNOWLEDGE, KNOWLEDGE FOR MANAGEMENT INFORMATION SYSTEM AND MAJOR SOLUTIONS<br><br>- ARBITRATING BETWEEN CEO AND MIDDLE MANAGERS, AND MANAGING MIDDLE MANAGERS | ⇨ - INFORMATIONIZATION PLAN, AND IT TREND<br><br>- ACKNOWLEDGEMENT AND ATTITUDE FOR INFORMATIONIZATION<br><br>- IT-RELATED KNOWLEDGE, EDUCATION, AND CAREER | ⇨ - INFORMATION MIND<br><br>- KNOWLEDGE OF INFORMATION TECHNOLOGY |
| MIDDLE MANAGERS | - MAKING SUPPORT FOR DIRECTORS<br><br>- ABILITY OF UTILIZING PRINCIPAL INFORMATION SYSTEM AND SOLUTIONS, DRIVING BUSINESS, AND ANALYZING PERFORMANCE<br><br>- ARBITRTING BETWEEN DIRECTORS AND WORKERS, AND MANAGING AND EDUCATING WORKERS | ⇨ - INFORMATIONIZATION PLAN, AND IT TREND<br><br>- INFORMATION SYSTEM AND SOLUTIONS<br><br>- INFORMATION COLLECTION AND MANACGEMENT | ⇨ - KNOWLEDGE OF INFORMATION TECHNOLOGY<br><br>- CAPABILITY OF INFORMATION APPLICATION |
| WORKERS | - SUPPORTING TASKS AND INFORMATIONIZATION IMPLEMENTATION OF MIDDLE MANAGERS<br><br>- PERFORMING CORRESPONDING MAJOR TASKS AND INFORMATIONIZATION, IMPLEMENTATION, AND PERFORMANCE ANALYSIS<br><br>- PERFORMING TASKS BY UTILIZING IT KNOWLEDGE AND SOLUTIONS, AND INFORMATION SYSTEM | ⇨ - IT-RELATED KNOWLEDGE<br><br>- INFORMATION SYSTEM AND SOLUTIONS<br><br>- INFORMATION-RELATED EDUCATION | ⇨ - KNOWLEDGE OF INFORMATION TECHNOLOGY<br><br>- CAPABILITY OF INFORMATION APPLICATION |

Fig.4C

| DIVISION | | CORE EVALUATION DOMAINS FOR BUSINESS POSITION | | | |
|---|---|---|---|---|---|
| | | CEO | DIRECTOR | MIDDLE MANAGER | WORKER |
| CORE EVALUATION DOMAINS FOR TASKS | STRATEGY PLAN | INFORMATION MIND<br><br>POTENTIAL OF INFORMATION CAPABILITY | INFORMATION MIND<br><br>KNOWLEDGE OF INFORMATION TECHNOLOGY | INFORMATION MIND<br><br>KNOWLEDGE OF INFORMATION TECHNOLOGY | KNOWLEDGE OF INFORMATION TECHNOLOGY<br><br>CAPABILITY OF INFORMATION APPLICATION |
| | DEVELOPMENT/ MAINTENANCE | | INFORMATION MIND<br><br>KNOWLEDGE OF INFORMATION TECHNOLOGY | KNOWLEDGE OF INFORMATION TECHNOLOGY<br><br>ABILITY OF UTILIZING INFORMATION | KNOWLEDGE OF INFORMATION TECHNOLOGY<br><br>CAPABILITY OF INFORMATION APPLICATION |
| | BUSINESS APPLICATION | | INFORMATION MIND<br><br>CAPABILITY OF INFORMATION APPLICATION | KNOWLEDGE OF INFORMATION TECHNOLOGY<br><br>CAPABILITY OF INFORMATION APPLICATION | KNOWLEDGE OF INFORMATION TECHNOLOGY<br><br>CAPABILITY OF INFORMATION APPLICATION |
| | ADMINISTRATION SUPPORT | | INFORMATION MIND<br><br>CAPABILITY OF INFORMATION APPLICATION | KNOWLEDGE OF INFORMATION TECHNOLOGY<br><br>CAPABILITY OF INFORMATION APPLICATION | KNOWLEDGE OF INFORMATION TECHNOLOGY<br><br>CAPABILITY OF INFORMATION APPLICATION |

Fig.8A

| EVALUATION DOMAINS | MATURITY STAGES BY EVALUATION INDICES OF EACH EVALUATION DOMAIN | EVALUATION INDICES BY MVLTPLYING WEIGHT VALVES OF EACH EVALUATION DOMAIN | |
|---|---|---|---|
| INFORMATION MIND | PROFICIENT (61 ~ 80) | 26.44 | |
| KNOWLEDGE OF INFORMATION TECHNOLOGY | PROFICIENT (61 ~ 80) | 15.91 | B1 |
| CAPABILITY OF INFORMATION APPLICATION | PROFICIENT (61 ~ 80) | 12.88 | |
| POTENTIAL OF INFORMATION CAPABILITY | COMPETENT (41 ~ 60) | 12.74 | |
| EVALUATION INDEX OF INFORMATION COMPETENCY (EIIC) | PROFICIENT (61 ~ 80) | 67.97 | |

Fig.8B

| WEIGHT VALUES | EVALUATION INDICES SUMMING UP EVALUATION INDICES OF EACH EVALUATION ELEMENT | EVALUATION ELEMENTS |
|---|---|---|
| 0.333 | 70.38 | INFORMATION STRATEGY PLAN |
| | | IT TREND |
| | | SENSE OF VALUES FOR INFORMATION |
| 0.250 | 63.64 | INFORMATION BASE TECHNOLOGY |
| | | INFORMATION APPLICATION TECHNOLOGY |
| | | INFORMATION SYSTEM |
| 0.199 | 64.71 | ABILITY OF INFORMATION USE |
| | | ABILITY OF INFORMATION APPLICATION |
| | | ABILITY OF INFORMATION MANAGEMENT |
| 0.218 | 58.45 | INFORMATION BASE |
| | | DEVELOPMENT OF INFORMATION ABILITY |
| | | PRODUCTION OF INFORMATION KNOWLEDGE |
| 1.000 | TOTAL EVALUATION INDEX OF INFORMATION COMPETENCY(EIIC) IS 67.97 AND PROFICIENT LEVEL | |

| EVALUATION INDICES MULTIPLYING WEIGHT VALUES BY VALUES OF EACH EVALUATION ELEMENT | WEIGHT VALUES | EVALUATION VALUES ESTIMATED BY EVALUATION ITEMS OF EACH EVALUATION ELEMENT | CORE EVALUATION DOMAINS |
|---|---|---|---|
| 27.50 | 0.393 | 70 | |
| 25.84 | 0.323 | 80 | ○ |
| 17.04 | 0.284 | 60 | |
| 25.84 | 0.364 | 70 | |
| 19.26 | 0.321 | 60 | ○ |
| 18.90 | 0.315 | 60 | |
| 30.64 | 0.383 | 80 | |
| 19.02 | 0.317 | 60 | |
| 15.05 | 0.301 | 50 | |
| 31.50 | 0.525 | 60 | |
| 18.55 | 0.265 | 70 | |
| 8.40 | 0.210 | 40 | |
| TOTAL EVALUATION INDEX OF INFORMATION COMPETENCY(EIIC) IS 67.97 AND PROFICIENT LEVEL | | | |

(B2) indicator points to row with 18.90 / 0.315 / 60.

Fig.10D

| DIVISION | | MATURITY LEVELS | | | | | REMARKS |
|---|---|---|---|---|---|---|---|
| | | NOVICE | COMPETENT | PROFICIENT | EXPERT | | |
| | | 0 | 20 | 40 | 60 | 80 | 100 | |
| RANGES OF EVALUATION INDICES OF EACH MATURITY STAGE | | | | | | | |
| AVERAGE EVALUATION INDEX OF INFORMATION COMPETENCY FOR DEVELOPMENT AND MAINTENANCE DEPARTMENT | | 47.41 | | | | | COMPETENT LEVEL |
| EVALUATION INDICES OF EACH EVALUATION DOMAIN | INFORMATION MIND | 49.27 | | | | | COMPETENT LEVEL |
| | KNOWLEDGE OF INFORMATION TECHNOLOGY | 61.42 | | | | | PROFICIENT LEVEL |
| | CAPABILITY OF INFORMATION APPLICATION | 50.53 | | | | | COMPETENT LEVEL |
| | POTENTIAL OF INFORMATION CAPABILITY | 31.40 | | | | | NOVICE LEVEL |

REPORTING FORMAT FOR EVALUATION
RESULT OF INFORMATION COMPETENCY

Fig.18B

| SUMMARY OF GENERAL EVALUATION |
|---|

THE EVALUATION INDEX OF GIL-DONG HONG OBTAINS TOTAL 75.1 AND IS "PROFICIENT LEVEL" IN PERSONAL INFORMATION MATUIRTY STAGES.

AN INDIVIDUAL AT PROFICIENT LEVEL HAS EXCELLENT UNDERSTANDING AND UTILIZATION CAPABILITY OF INFORMATION AND THE CAPABILITY THAT CAN EFFICIENTLY PERFORM BUSINESS TASKS AND DIFFUSE INFORMATION TO OTHER PERSONS.

YOU ARE EXPECTED TO BE "EXPERT LEVEL" IN THE FUTURE AND RECOMMENDED TO TAKE INFORMATION EDUCATION FOR AN EXPERT.

PLEASE REFER TO FOLLOWING TABLES FOR THE DETAILED EDUCATION SUBJECTS OF EXPERT COURSE

EDUCATIONAL COURSE FOR IMPROVEMENT OF INFORMATION COMPETENCY

Fig.18D

| DOMAINS | IMPORTANCE | MAJOR EDUCATIONAL TASKS |
|---|---|---|
| INFORMATION MIND | 10 | ● PRACTICE FOR IT MIND AND CHANGE MANAGEMENT TECHNIQUES FOR MANAGEMENT RENOVATION<br>● STUDY ON BENCH MARKING CASE OF IT KNOWLEDGE MANAGEMENT FOR OVERALL ENTERPRISE INTELLECTUAL PROPERTY OF BUSINESS KNOW-HOW<br>● DIGITAL INFORMATION SECURITY AND ETHIC CONSCIOUSNESS WITHIN AN ENTERPRISE |
| KNOWLEDGE FOR INFORMATION TECHNOLOGY | 35 | ● KNOWLEDGE FOR H/W, S/W, N/W, AND DB<br>● NEW TRENDS FOR MANAGEMENT RENOVATION THROUGH IT<br>● MANAGEMENT INNOVATION CASES OF ADVANCED ENTERPRISES THROUGH INTRODUCING NEW IT TECHNOLOGY |
| CAPABILITY OF INFORMATION APPLICATION | 35 | ● INFORMATION MANAGEMENT SKILLS RELATED TO AUTOWAY, PC, AND THE INTERNET<br>● COMMUNICATION TECHNIQUE OF IT REQUIREMENTS FOR CONSTRUCTING GLOBAL MANAGEMENT RENOVATION SOLUTIONS<br>● UNDERSTANDINGS OF ENTIRE MAJOR INFORMATION SYSTEM (IN ENTERPRISE/INTER-ENTERPRISE/TO CUSTOMERS) |
| POTENTIAL OF INFORMATION CAPABILITY | 20 | ● COMPLETION OF EDUCATION COURSES FOR DEGREES AND CERTIFCATES<br>● COMPLETION OF DOMESTIC AND OVERSEA EDUCATION COURSES RELATED TO IT AND INFORMATIONIZATION<br>● PRODUCTIONS AND PUBLICATIONS OF KNOWLEDGE RELATED TO INFORMATION |

Fig.18E

| DOMAINS | IMPORTANCE | DETAIL CONTENTS OF EACH EDUCATIONAL SUBJECT |
|---|---|---|
| INFORMATION MIND | 10 | ● PRACTICES OF IT MIND AND CHANGE MANAGEMENT TECHNIQUES FOR MANAGEMENT RENOVATION<br>-UNDERSTANDING OF HKMC INFORMATIONIZATION STRATEGY<br>-UNDERSTANDING FOR EFFECTIVENESS OF INFORMATION SYSTEM DOMAINS IN EACH DEPARTMENT<br><br>● STUDY ON BEST PRACTICES OF IT KNOWLEDGE MANAGEMENT FOR OVERALL ENTERPRISE INTELLECTUAL PROPERTY OF BUSINESS KNOW-HOW<br>-ANALYSIS FOR BEST CASES OF IT KNOWLEDGE MANAGEMENT IN EACH BUSINESS DEPARTMENT CHARACTERISTICS SUCH AS MARKETING, MANUFACTURING, SALES, AND RESEARCH AND DEVELOPMENT(R&D)<br>-REVIEW FOR SHARING DIGITAL INFORMATION AND DIGITAL PROPERTY LAW, SYSTEM, AND CULTURE FOR DIGITAL INFORMATION LEADER OF ENTERPRISE<br><br>● DIGITAL INFORMATION SECURITY AND MORALS IN ENTERPRISE<br>-RISK AND INFLUENCE OF INFORMATION SECURITY<br>-DIGITAL ETHICS AND ETIQUETTE DEMANDED BY ENTERPRISE |

Fig.18F

| DOMAINS | IMPORTANCE | DETAIL CONTENTS OF EACH EDUCATIONAL SUBJECT |
|---|---|---|
| KNOWLEDGE OF INFORMATION TECHNOLOGY | 35 | ● KNOWLEDGE FOR H/W, S/W, N/W, AND DB<br>  -BRIEFING FOR RECENT PC, H/W, AND N/W TREND<br>  -REVIEW FOR S/W AND UTILITIES FOR PC MANAGEMENT<br>● NEW TREND OF MANAGEMENT RENOVATION THROUGH IT<br>  -NEW TREND OF MANAGEMENT RENOVATION SOLUTIONS OF ADVANCED ENTERPRISE SUCH AS ERP, CRM, SCM, AND KMS<br>  -MOVEMENT IN E-BUSINESS MODEL OF MOTOR INDUSTRY<br>● MANAGEMENT INNOVATION CASES OF ADVANCED ENTERPRISES BY INTRODUCING NEW IT TECHNOLOGY<br>  -STUDY FOR RTE(REAL TIME ENTERPRISE) STRATEGY OF GM AND TOYOTA<br>  -CONCENTRATIVE STUDY FOR IT INNOVATION CASES IN EACH VALUE CHAIN OF GM AND TOYOTA |

Fig.18G

| DOMAINS | IMPORTANCE | DETAIL CONTENTS OF EACH EDUCATIONAL SUBJECT |
|---|---|---|
| CAPABILITY OF INFORMATION APPLICATION | 35 | ● INFORMATION MANAGEMENT SKILLS FOR AUTOWAY, PC, AND THE INTERNET<br>　-UNDERSTANDING AND UTILIZATION OF O/S MANAGEMENT FUNCTIONS (DISK ARRANGEMENT, SYSTEM RECOVERY, H/W AND S/W MANAGEMENT)<br>　-UNDERSTANDING AND USE OF MANAGEMENT FUNCTIONS OF THE INTERNET (NETWORK SETTING AND SYSTEM SECURITY)<br>● COMMUNICATION TECHNIQUE OF IT REQUIREMENTS FOR CONSTRUCTING GLOBAL MANAGEMENT RENOVATION SOLUTIONS<br>　-UNDERSTANDING OF PROJECT OBJECTIVES AND PROCEDURES OF STANDARD SYSTEMS (ERP ANDVAATZ ETC.) FOR SUPPORTING GLOBAL MANAGEMENT<br>　-STUDYING FOR STRUCTURAL THINKING METHODS AND COMMUNICATION SKILLS<br>● UNDERSTANDING OF ENTIRE MAJOR INFORMATION SYSTEMS (IN ENTERPRISE/INTER-ENTERPRISE/TO CUSTOMERS)<br>　-MANUFACTURING: UTILIZATION OF GLOBAL APS, QUALITY INFORMATION ANALYSIS SYSTEMS, AND INTEGRATED INSTALLATION MANAGEMENT SYSTEMS<br>　-MANAGEMENT: UTILIZATION OF GLOBAL PERFORMANCE MANAGEMENT SYSTEMS AND INTEGRATED FINANCIAL INFORMATION SYSTEMS |
| POTENTIAL OF INFORMATION CAPABILITY | 20 | ● COMPLETION OF EDUCATION COURSES FOR DEGREES AND CERTIFICATES<br>　-COMPLETION OF EDUCATION COURSES FOR DEGREES AND CERTIFICATES RELATED TO IT AND INFORMATIONIZATION<br>● COMPLETION OF DOMESTIC AND OVERSEA EDUCATION COURSES RELATED TO IT AND INFORMATIONIZATION<br>　-PARTICIPATION IN DOMESTIC AND OVERSEA TRAINING COURSES RELATED TO IT AND INFORMATIONIZATION<br>● PRODUCTION AND PUBLICATION OF INFORMATION KNOWLEDGE<br>　-EFFORTS FOR BOOK PUBLICATION, PARTICIPATION, AND ANNOUNCEMENT IN SEMINARS RELATED TO IT AND INFORMATIONIZATION |

SYSTEM FOR EVALUATING INFORMATION COMPETENCY AND METHOD THEREOF

BACKGROUND OF THE INVENTION

1. Field of the Invention

The present invention relates to a system for evaluating personal information competency in an information-oriented environment and a method thereof, and more particularly, to a system for integrally evaluating personal information competency of a person such as information competency and maturity level of a person.

2. Description of the Related Art

Recently, most enterprises have built an information system for the purpose of improving the competitiveness of an enterprise and of maximizing business efficiency in response to a global management environment which has changed while information technology has been being developed.

Generally, resources of an enterprise are categorized into physical resources, human resources, and organizational resources, and enterprises secure the physical resources, the human resources, and the organizational resources to be superior to those of competitive enterprises to increase the enterprise's own capability and competitive power. Particularly, among the resources, the human resources of managing and handling other resources entirely plays a very important role. Therefore, in order to improve the competitive power and to increase the business efficiency, the human resources of the enterprise of effectively performing business plays a very important role. In other words, in the information environment, how much excellent human resources is guaranteed and how the human resources efficiently utilizes information technology (IT) are important factors to determine the future of the organization.

In order to effectively manage and develop the human resources, it is necessary for precisely evaluating personal information competency and to propose and manage a target for improving and developing the personal information competency based on the evaluation. In other words, it is necessary for the developing and building of human resources that can increase the competitive power and business efficiency of the enterprise through a reliable evaluation of the personal information competency. Here, the person information competency means overall capability of a person utilizing information.

There have been many researches for end users and user computing relating to the personal information competency evaluation, however most of them lay stress on evaluation for personal ability on information technology and of using functions of a computer of the end users. Moreover, there are tests of evaluating personal ability of using internet, a computer, and information technology, such as i-Test, e-Test, ITQ, IPCT, and PCT. However, they examine simple personal information-functional ability and have difficulty in evaluating personal total information capability. Thus, it is difficult to adopt the test result in training and managing the human resources. Hence, we need a system for more fully diagnosing and evaluating the personal information competency in order to effectively develop and manage the human resources suitable to an information environment.

SUMMARY OF THE INVENTION

Therefore, the present invention has been made in view of the above problems, and it is an object of the present invention to provide a system for diagnosing and evaluating information competency of a person that must be prepared for effectively performing business in an information environment and for analyzing the evaluation result to provide the analyzed result, and a method thereof.

In accordance with the present invention, the above and other objects can be accomplished by the provision of an information competency evaluation system connected to a terminal of an evaluation target for evaluating a level of information competency and a maturity of the evaluation target, comprising: an evaluation model database to classify and store a plurality of evaluation groups which are classified by business departments and positions and evaluation problems by a plurality of evaluation domains in which components of the information competency are classified by domains; an education information database to classify and store education information, corresponding to a plurality of maturity stages, by the evaluation groups; an information competency evaluation server to select an evaluation group corresponding to the evaluation target according to a business department and position of the evaluation target, to read the evaluation problems corresponding to the selected evaluation group by the evaluation domains from the evaluation model database to provide the same to the terminal, to evaluate evaluation responses that are received from the terminal due to the provision of the evaluation problems to estimate an evaluation result, and to output evaluation indices for the evaluation domains in which weight values of evaluation elements are applied to the evaluation result and evaluation indices of information competency in which weight values of the evaluation domains are applied to the evaluation indices of the evaluation domains; an information competency maturity evaluation server to select a first maturity stage corresponding to the evaluation index of information competency and a second maturity stage corresponding to the an evaluation index of a core evaluation domain with higher importance among the evaluation indices from the plurality of maturity stages, to compare the first maturity stage with the second maturity stage, and to select and output the information competency maturity stage of the evaluation target; and an information competency analysis server to estimate an average evaluation index of information competency for the entire evaluation groups, an average evaluation index of information competency for the business departments, and an average evaluation index of information competency for the business position, to compare the estimated average indices with the evaluation indices of information competency of the evaluation target, to provide an analyzed result, made by the comparison, with the evaluation indices of the evaluation domains, the evaluation indices of information competency, and the information competency maturity stage for the evaluation target to the terminal, and to read the education information corresponding to the information competency maturity stage of the evaluation target from the education information database to provide the read education information to the terminal.

In accordance with the present invention, the above and other objects can be accomplished by the provision of a method of evaluating a level of information competency and a maturity of an evaluation target carried out by a system connected to a terminal of an evaluation target through a network, the method comprising: classifying evaluation problems by a plurality of evaluation groups in which evaluation target groups, to which the evaluation target belongs, are classified by business departments and business positions, and by a plurality of evaluation domains in which components of information competency are classified by domains; selecting an evaluation group to which the evaluation target belongs by a business department and a business position of the evaluation target from the plurality of evaluation groups, and providing the evaluation problems corresponding to the selected evaluation group to the terminal according to the evaluation domains; evaluating an evaluation response with respect to the provision of the evaluation problems which are received from the terminal, and estimating evaluation indices of the evaluation domains in which weight values of importance for the evaluation elements are applied to the evaluation result and evaluation indices of information competency in which weight values of importance for the evaluation domains are applied to the evaluation indices of the evaluation domains; selecting a first maturity stage corresponding to the evaluation index of information competency and a second maturity stage corresponding to a core evaluation domain with high importance among the evaluation domains from a plurality of maturity stages, and selecting an information competency maturity stage of the evaluation target by comparing the first maturity stage with the second maturity stage; estimating an average evaluation index of information competency of the entire evaluation group, average evaluation indices of information competency by each business department, and average evaluation indices of information competency by each business position for the evaluation target group; providing a result of comparing the evaluation index of information competency of the evaluation target with the average evaluation index of information competency of the entire evaluation group, the average evaluation indices of information competency by the business departments, and the average evaluation indices of information competency by the business positions together with the evaluation index of information competency and the information competency maturity stage to the terminal; and providing education information corresponding to the information competency maturity stage of the evaluation target to the terminal.

BRIEF DESCRIPTION OF THE DRAWINGS

The above and other objects, features and other advantages of the present invention will be more clearly understood from the following detailed description taken in conjunction with the accompanying drawings, in which:

FIG. 4A is a schematic structure chart illustrating a method of deriving a core evaluation domain by considering information characteristics corresponding to respective business departments according to an embodiment of present invention;

FIG. 4B is a schematic structure chart illustrating a method of deriving a core evaluation domain by considering characteristics of respective business position according to an embodiment of present invention;

FIG. 4C is a schematic structure chart illustrating a method of deriving a core evaluation domain by considering characteristics of respective evaluation groups according to an embodiment of the present invention;

FIG. 8 is a table illustrating an example in which a first maturity stage selection unit determines a first maturity stage according to an embodiment of the present invention;

FIG. 10D is a chart illustrating examples of an average evaluation index of respective evaluation domains and an average evaluation index of information competency for members of a development and management department according to an embodiment of the present invention;

DETAILED DESCRIPTION OF THE PREFERRED EMBODIMENTS

Figure 1:
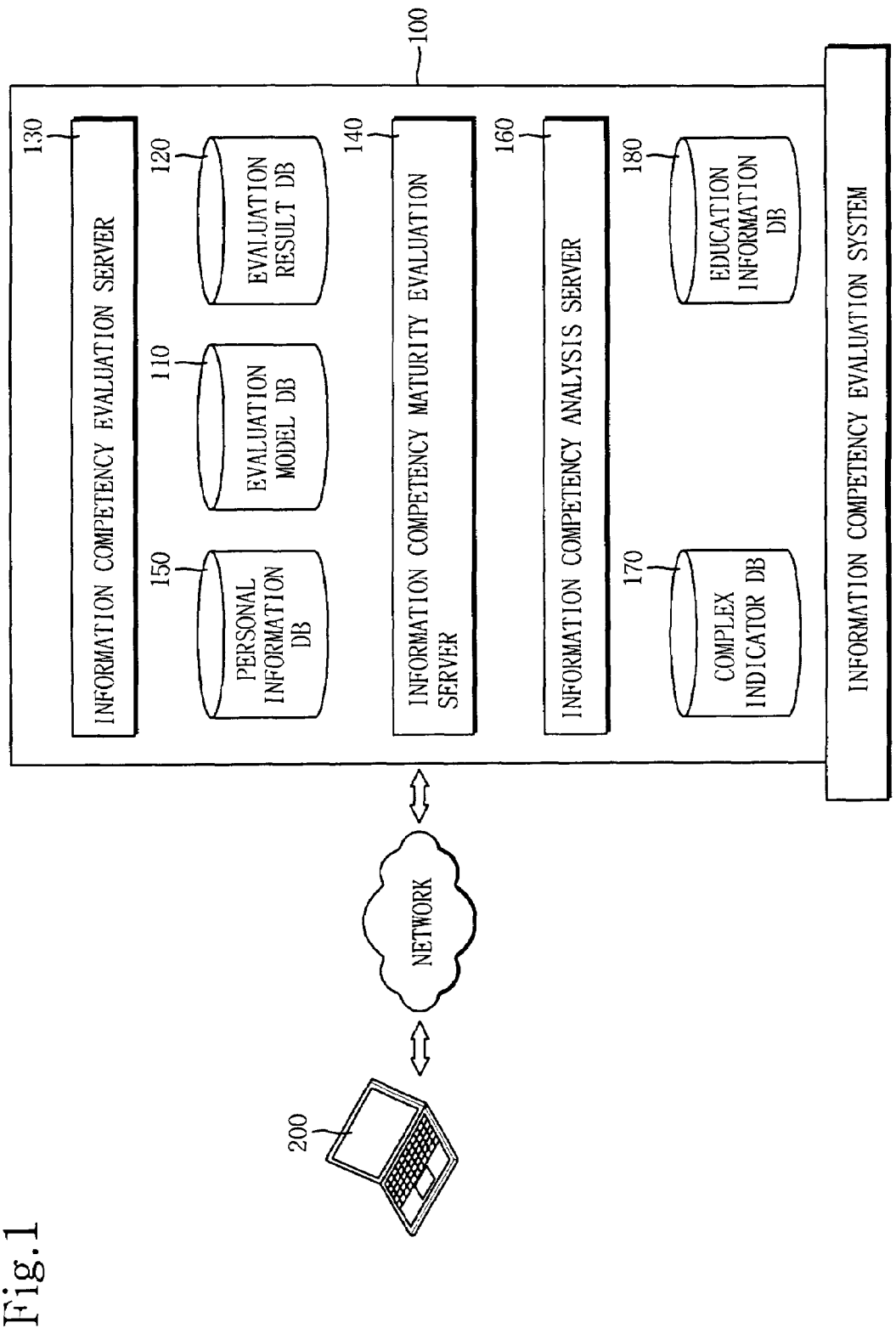
FIG. 1 is a schematic structural diagram illustrating a system for evaluating personal information competency according to an embodiment of the present invention.

Hereinafter, preferred embodiments of the present invention will be described in detail with reference to accompanying drawings such that those skilled in the art may easily carry out the present invention. However, various changes in form and detail may be made without departing from the spirit and scope of the invention. In the drawings, for the purpose of clear description for the present invention, parts without relating to the description are removed from the drawings and similar reference numerals are assigned to similar components over entire drawings.

Through the description, when a unit 'comprises' some components, this does not mean that other components are excluded but that the unit may further comprise other components unless there is a contrary description. Moreover, terms such as a "unit" or a "device", mentioned in the description, means a unit to perform at least one function or operation and it may be implemented by a hardware, a software, or a combination of a hardware and a software.

Hereinafter, a system for evaluating information competency and a method thereof according to an embodiment of the present invention will be described in detail.

On the other hand, in the embodiments of the present invention, a system for evaluating information competency of a person corresponding to human resources of an enterprise will be described as an example. Hereinafter, an enterprise to which information competency will be evaluated by the system for evaluating information competency is referred to as an "evaluation target group", and a person as a member of the evaluation target group whose information competency will be evaluated is referred to as an "evaluation target". Moreover, one that is implemented as an algorithm by combining references and rules to be applied to derive an evaluation index of information competency or a maturity stage of the evaluation target is referred to as an "evaluation model". This evaluation model is set in advance by considering characteristics of the evaluation target group when the system is designed. Meanwhile, the evaluation index of information competency is a numerical value becoming an index indicating a level of information competency, and the information competency maturity stage becomes an index indicating a level of the maturity of information competency. Moreover, the level of information competency and the level of maturity are used as evaluation elements for evaluating personal information competency as the evaluation target.

FIG. 1 is a schematic structural diagram illustrating a system 100 for evaluating personal information competency according to an embodiment of the present invention.

As illustrated in FIG. 1, the system 100 includes an evaluation model database (DB) 110, an evaluation result database 120, an information competency evaluation server 130, and an information competency maturity evaluation server 140, and may further include a personal information database 150, an information competency analysis server 160, a complex indicator database 170, and an education information database 180. Moreover, the information competency evaluation system 100 is connected to a terminal 200 of an evaluation target via a network.

The evaluation model database 110 classifies evaluation problems based on respective evaluation groups that are classified in the basis of business departments and business positions, and classifies and stores the evaluation problems, which are classified based on the evaluation groups, with respect to respective evaluation domains. Moreover, an evaluation domain with high importance in a corresponding evaluation group is selected as a core evaluation domain from the evaluation domains, and information on the selected core evaluation domain is stored in the evaluation model database 110. On the other hand, a method of classifying the evaluation groups and the evaluation domains and of selecting the core evaluation domain will be described later in detail.

The information competency evaluation server 130, when the evaluation target request for the evaluation of information competency, containing identification information of the evaluation target through the terminal 200, selects an evaluation group corresponding to the evaluation target from the input identification information. After the selection of the evaluation group, the information competency evaluation server 130 reads an evaluation problem corresponding to the corresponding evaluation group from the evaluation model database 110 to provide the same to the evaluation target, and receives a response with respect to the provided problem from the evaluation group through the terminal 200 to produce evaluation results by scoring the evaluation domains according to a score distribution logic. After that, the evaluation results are classified by the evaluation groups and the evaluation targets to be stored. Moreover, the information competency evaluation server 130 estimates the evaluation index by the evaluation domains from the evaluation results, applies weight, which is differently applied according to importance of the evaluation domains, to the evaluation indices of the respective evaluation domains, estimates the evaluation index of information competency (EIIC) calculated by summing the values, and stores the estimated evaluation index of information competency in the evaluation result database 120.

On the other hand, there may be several methods of acquiring identification information of the evaluation target needed for the information competency evaluation server 130 to classify the evaluation groups and to store the evaluated results, i.e., information corresponding to name, age, sexuality, business departments, business positions, etc. of the evaluation target. One of the methods is to directly receive the identification information through the terminal 200. Alternatively, personal information of entire evaluation targets belonging to the evaluation target group, such as names, ages, sexualities, business departments, business positions, and information about the corresponding evaluation group may be acquired from the personal information database 150. In a case of the latter, when the identification number or an ID of the evaluation target is inputted from the terminal 200, the information competency evaluation server 130 reads identification information of the evaluation target, corresponding to the inputted ID from the personal information database 150 to use in the evaluation.

The information competency maturity evaluation server 140 determines a first maturity stage corresponding to the evaluation index of information competency of the evaluation target among a plurality of maturity stages, and a second maturity stage only using an evaluation index (EI) corresponding to the core evaluation domain. Finally, the information maturity evaluation server 140 compares the first maturity stage with the second maturity stage to determine the information competency maturity of the evaluation target. For example, if the first maturity stage is equal to or lower than the second maturity stage, the first maturity stage is determined as the information competency maturity stage of the evaluation target, and if not, a maturity stage lower than the first maturity stage by one stage is determined as the information competency maturity stage of the evaluation target. When the information competency maturity stage of the evaluation target is determined, the determined information competency maturity stage is classified by the evaluation groups and the evaluation targets and is stored in the evaluation result database 120.

The complex indicator database 170 stores a plurality of complex indicators representing the personal information competency, and the education information database 180 stores education information corresponding to four maturity stages by the respective evaluation groups.

The information competency analysis server 160 estimates average evaluation indices of information competency of the entire evaluation groups, average evaluation indices by business departments, and average evaluation indices by business positions, using the evaluation index of information competency of the entire evaluation targets belonging to the evaluation target groups that are stored in the evaluation result database 120. The information competency analysis server 160 compares the average evaluation index of information competency corresponding to the business department of the evaluation targets, the average evaluation index of information competency corresponding to the business position of the evaluation targets, and the average evaluation index of information competency of the entire evaluation groups with the evaluation index of information competency (EIIC) of the evaluation targets, and provides the compared result to the evaluation targets through the terminal 200.

Moreover, the information competency analysis server 160 reads the plurality of complex indicators from the complex indicator database 170 and divides the same by the complex indicators corresponding to the evaluation result of the evaluation target so as to evaluate what level of information competency the evaluation target exhibits in the complex indicators and to provide the evaluated result to the evaluation target. Moreover, the information competency analysis server 160 reads the education information to be applied to the evaluation target from the education information database 180 in accordance with the information competency maturity stage of the evaluation target and provides the education information to the evaluation target.

Figure 2:
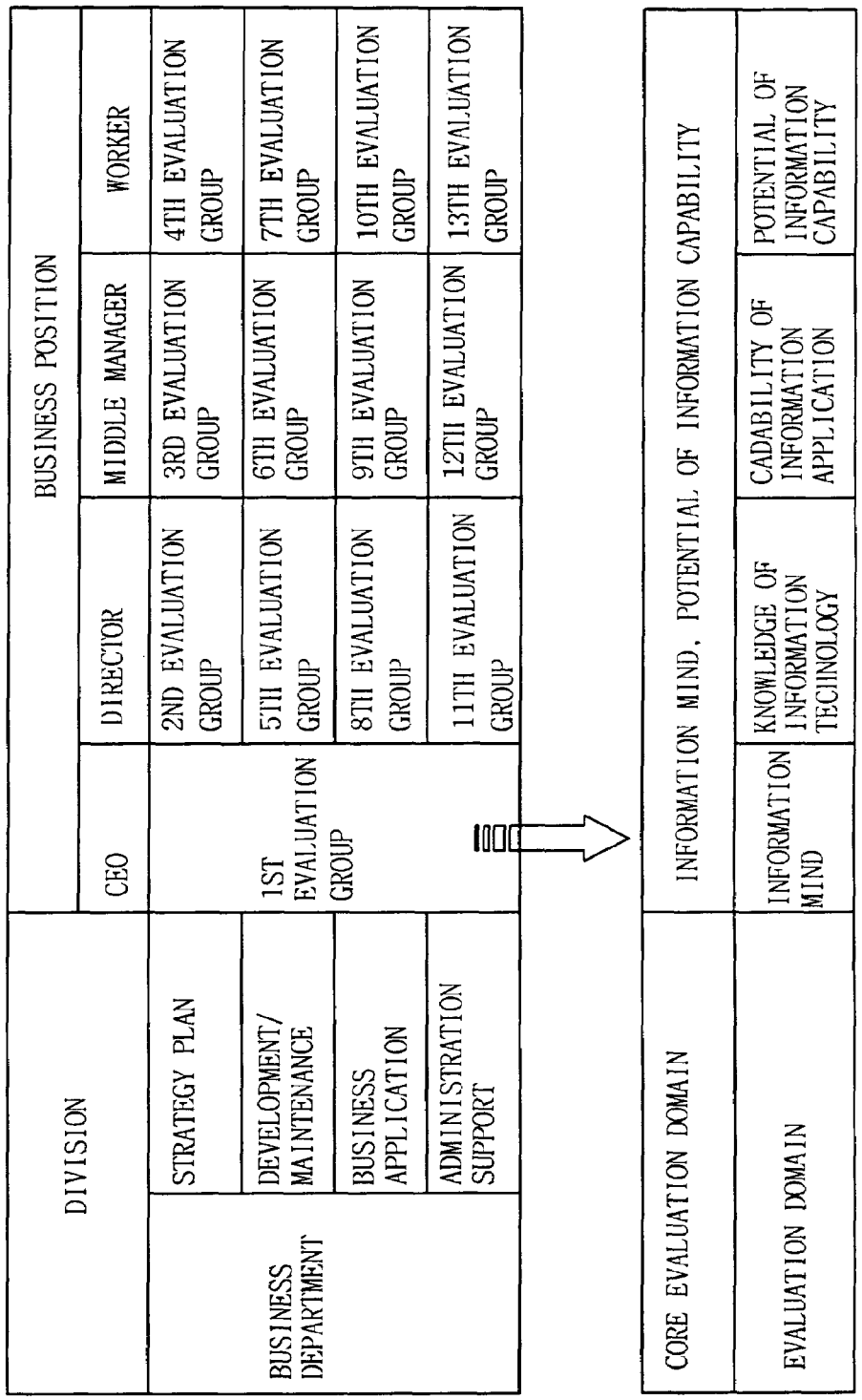
FIG. 2 is a schematic structure chart illustrating a structure of an evaluation model database according to an embodiment of the present invention.

FIG. 2 is a schematic structure chart illustrating a structure of the evaluation model database 110, according to an embodiment of the present invention, of classifying the evaluation groups by business departments and business positions and of deriving the evaluation domain and the core evaluation domain of one evaluation group as an example.

Referring to FIG. 2, the evaluation target groups are classified into thirteen evaluation groups by business departments and business positions, and evaluation problems corresponding to the respective evaluation groups are stored in accordance with the four evaluation domains in the evaluation model database 110. Moreover, among the four evaluation domains, information for two core evaluation domains, whose importance is determined high according to feature of the corresponding evaluation group, is stored in the evaluation model database 110.

On the other hand, the information stored in the evaluation model database 110 is determined when designing the system and by an information competency evaluation model. Here, the information competency evaluation model means a model in which the evaluation references and the evaluation rules are combined for estimating the evaluation index of information competency (EIIC) indicating the personal information competency level of the evaluation target.

According to the information competency evaluation model, the evaluation target groups are classified into a plurality of evaluation groups by business departments and business positions. Referring to FIG. 2, the evaluation target groups are classified into a CEO, a director, a middle manager, and a worker and the three business positions except for the CEO are classified by business departments into four fields such as strategic plan, development, business application, and administration support, so that the evaluation groups are classified into a total of 13 groups. Moreover, in the information competency evaluation model, a plurality of evaluation domains is classified in order to evaluate the information competency of the evaluation targets. These evaluation domains are made by deriving the components which build the personal information competency in an information perspective from a common environment and an organizational environment, and by classifying the components by domains.

Figure 3:
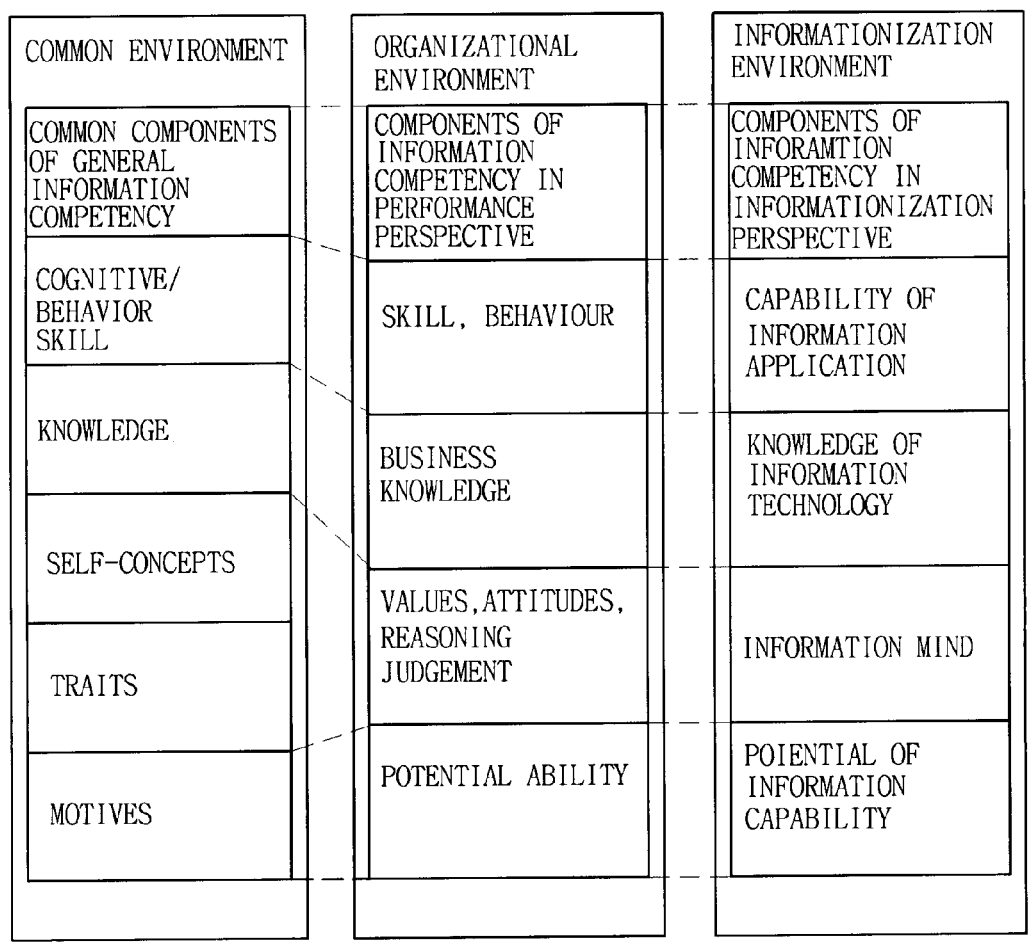
FIG. 3 is a schematic structure chart illustrating a method of deriving an evaluation domain according to an embodiment of the present invention.

FIG. 3 is a schematic structure chart illustrating a method of deriving an evaluation domain according to the embodiment of the present invention.

Referring to FIG. 3, the number of the evaluation domains is four, classified into the capability of information application, the knowledge of information technology, the information mind, and the potential of information capability. These evaluation domains are derived from the components building the personal information competency in a common environment and an organizational environment.

In the information competency evaluation model, ranges, degrees of difficulty, and application ways of the respective evaluation domains are differed according to features of the respective evaluation groups, and the evaluation problems are differently selected according to the respective evaluation groups by consideration in view of functions such as operation, development, and control of the evaluation groups. Moreover, by considering business positions and features of business departments by the respective evaluation groups, two core evaluation domains with high importance are selected by importance according to the evaluation domains from the four evaluation domains and different weight is applied to the evaluation domains and the evaluation problems.

Meanwhile, as described above, the evaluation domains with high importance are selected from the four core evaluation domains by the evaluation groups according to the feature of the evaluation groups and information about the core evaluation domains is stored in the evaluation model database 110. To this end, the information competency evaluation system 100 refers to the information competency evaluation model to derive the core evaluation domains by considering features of business departments and business positions of the evaluation groups.

FIG. 4A is a schematic structure chart illustrating a method of deriving a core evaluation domain by considering information feature corresponding to respective business departments according to an embodiment of present invention, and FIG. 4B is a schematic structure chart illustrating a method of deriving a core evaluation domain by considering features of respective business positions according to an embodiment of the present invention.

As illustrated in FIG. 4A, the information competency evaluation system 100 has a grasp of the principal feature of business departments by respective fields of the business departments and selects the core evaluation domains by selecting core information features from the features of business departments. Referring to FIG. 4B, the information competency evaluation system 100 has a grasp of the principal features of the respective business position and selects the core evaluation domains by selecting core information features from the principal features of business position. As such, the core evaluation domains selected by the business departments and the business positions are used to select the core evaluation domains by the respective evaluation groups.

For example, as illustrated in FIG. 4A, a strategic planning department carries out establishment of management target and a strategy, plan, and analyzing of corporation performance, improves establishment and execution of information plans, and corporation performance, and manages, plans, and adjusts entire tasks, analyzes problems due to that, and proposes a suggestion for improvement. By doing so, a core informationization which is emphasized by the strategy and planning department may be the establishment of the informationization plan, IT trend, information-related recognition and laws/systems, and knowledge of information technology. Thus, the evaluation domain for evaluating the core informationization required to the strategy and planning department becomes the knowledge of the information mind and the information technology, so that the information mind and the knowledge of information technology become the core evaluation domain of the strategy and planning department.

The core evaluation domain considering the feature of the informationization by business position can be also selected by the same method as the above-mentioned method of deriving the core evaluation domain of the business departments, and the information competency evaluation system 100 summarizes the core evaluation domain of business position to select the core evaluation domain considering the feature of business departments and business positions.

FIG. 4C is a schematic structure chart illustrating a method of deriving a core evaluation domain by considering features of respective evaluation groups according to an embodiment of present invention.

Referring to FIG. 4C, core evaluation domains for the CEO are information mind and the potential of information capability, and core evaluation domains for the worker of the administration support department are the knowledge of information technology and the capability of information application. The selected core evaluation domains are also used to select weight classified by the evaluation domains for estimating the evaluation index of information competency and to determine the information maturity stage of the evaluation targets.

Meanwhile, the information competency evaluation model of the references such as the division of the evaluation groups and the evaluation domains, the choice of the core evaluation domains, and the choice of the evaluation problems of the respective evaluation domains, can be modified according to features of the evaluation target groups such as enterprises, government and municipal offices, and the like when designing the information competency evaluation system 100, and can be designed by surveying the features of the evaluation target groups and by considering the features of business departments.

Figure 5:
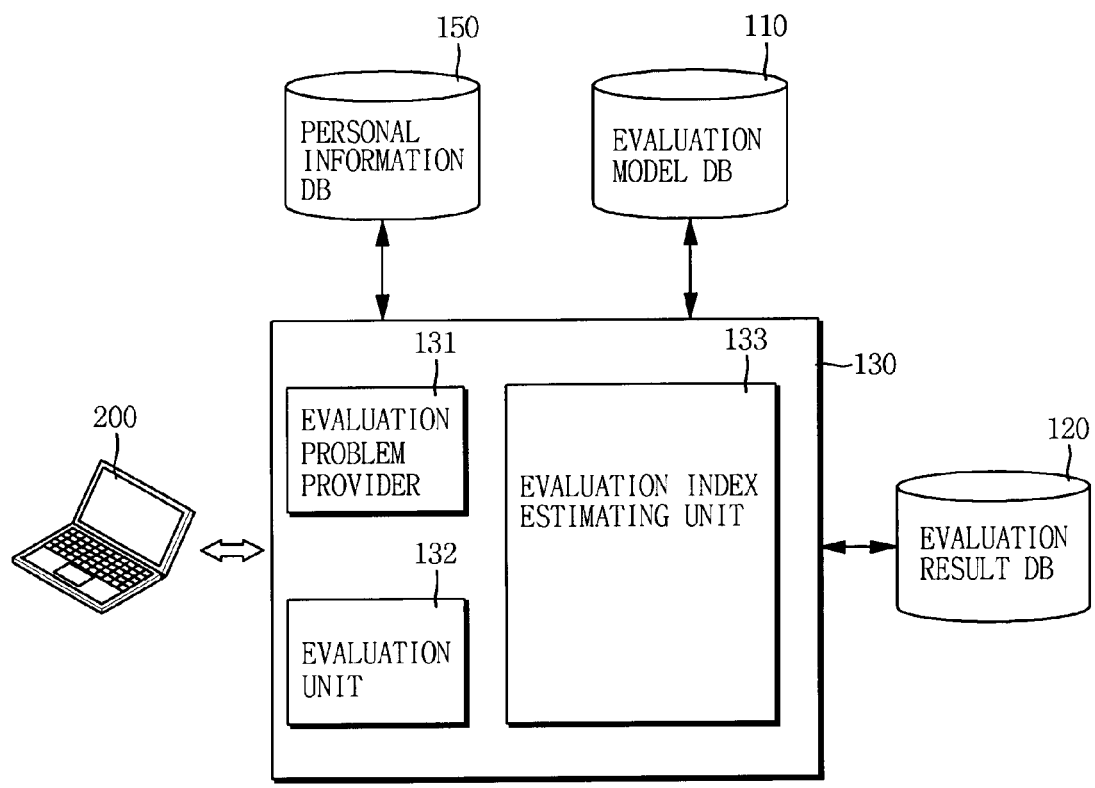
FIG. 5 is a schematic structural diagram illustrating an information competency evaluation server according to an embodiment of the present invention.

FIG. 5 is a schematic structural diagram illustrating an information competency evaluation server 130 according to the embodiment of the present invention.

Referring to FIG. 5, the information competency evaluation server 130 includes an evaluation problem provider (131), an evaluation unit (132), and an evaluation index estimating unit 133.

When an evaluation request containing the identification information of an evaluation target is generated by the terminal, the evaluation problem provider 131 reads the evaluation problems corresponding to the evaluation target from the evaluation model database 110 and provides the evaluation problems to the terminal 200. On the other hand, when an the identification information is transferred while containing an ID or an identification number of the evaluation target, the evaluation problem provider 131 reads information such as a business department and a business position of the evaluation target and an evaluation group to which the evaluation target belongs from the personal information database 150 and can use the same to read information on the evaluation problems and the core evaluation domains from the evaluation model database 110. On the contrary, when the identification information containing the business department and the business position of the evaluation target is transferred from the terminal 200, the evaluation problem provider 131 may select the evaluation group to which the evaluation target belongs based on the business department and the business position of the evaluation target to read the evaluation problems. This may be changed by a program which receives the evaluation request from the terminal to transfer the evaluation request and transfer the received evaluation request.

On the other hand, the evaluation problem provider 131 provides the evaluation problems classified by the evaluation domains to the terminal 200 and may apply the providing format of the evaluation problems by the respective evaluation domains.

The following Table 1 represents evaluation elements, evaluation items, and evaluation problem providing methods of the evaluation domains among the evaluation domains, corresponding to the information mind.

TABLE 1

| Information Mind | | | | |
|---|---|---|---|---|
| Evaluation domains | Evaluation elements | Evaluation items | Detailed evaluation items | Evaluation problems |
| Information mind | Informationization plan | Plan for informationization strategy | Objective and strategy of informationization Implementation plan for informationization by each department | Questionnaire |
| | | Plan for driving informationization | Implementation plan for informationization project Implementation situation for | |

TABLE 1-continued

| | | | Information Mind | |
|---|---|---|---|---|
| Evaluation domains | Evaluation elements | Evaluation items | Detailed evaluation items | Evaluation problems |
| | IT trend | Acceptability of recent IT | informationization project Subscription of magazines related to IT Number of joining with websites related to IT | |
| | | Propagation of recent IT | Publication of articles in IT magazines and Internal homepage Education in and out of enterprise related to information | |
| | Sense of values of information | Information fitness | Recognition and attitude (affirmative, negative) for information Understanding of information and talent of using information | |
| | | Information morality | Etiquette related to Information Understanding of Laws and institutions for information | |

Referring to Table 1, the information mind means general understanding, recognition, and sense of values of the informationization of a person working in an enterprise in the information environment. Thus, the information mind is evaluated by the evaluation elements such as the informationization plan, the IT trend, and the sense of values of information so that the evaluation problems are provided in the form of the questionnaire which questions the plan for informationization strategy and driving informationization, acceptability and propagation of recent IT, and the information fitness and morality.

The following Table 2 represents evaluation elements, evaluation items, and evaluation problem providing methods of the evaluation domains among the evaluation domains, corresponding to the knowledge of information technology.

TABLE 2

| | | | Knowledge of Information Technology | |
|---|---|---|---|---|
| Evaluation domains | Evaluation elements | Evaluation items | Detailed evaluation items | Evaluation problems |
| Knowledge of information technology | Information base technology | H/W and S/W | H/W: CPU, memory, I/O device, other devices S/W: system S/W, Application S/W, Programming language Operating system: O/S, operating system for Windows, Utilities etc. | Written evaluation problems |
| | | H/W and D/B | H/W: network framework, Transmission mode, Transmission medium, Switching technology, Communication network type, Multiplexing, Topology of network, Network related equipments, Connection method D/B: Data Model, DBMS, DW | |
| | Information application technology | Solution | ERP, SCM, KMS, CRM, PDM, and HRM etc. Information protecting solution | |
| | | Implementation of business | System integrating technology and e-Business E-trading and m-Business Information protection and Internet | |
| | Information system | Operating system | Knowledge of H/W, S/W, N/W, D/B of Operating | |

TABLE 2-continued

Knowledge of Information Technology

| Evaluation domains | Evaluation elements | Evaluation items | Detailed evaluation items | Evaluation problems |
|---|---|---|---|---|
| | | | system | |
| | | | Knowledge of Information protection | |
| | | Related system/regulation | Knowledge of Informationization Organism, Operation sequence, Information sytem/regulations | |
| | | | Knowledge of Information Security | |

Referring to Table 2, knowledge of information technology is evaluated by the evaluation elements such as the information base technology, the information application technology, and the information system. Thus, the evaluation problems for evaluating the knowledge of information technology are provided in the form of the written evaluation problems of questioning H/W and S/W, N/W and D/B, the solutions, the implementation of business, and knowledge of the operation system, and the related system and regulations.

The following Table 3 represents evaluation elements, evaluation items, and evaluation problem providing methods of the evaluation domains among the evaluation domains, corresponding to the knowledge of the capability of information application.

Referring to Table 3, the capability of information application is evaluated by the evaluation elements such as use, application, and management of information. Thus, the evaluation problems for evaluating the capability of information application are provided in the form of the application test of evaluating capability of using OA and Internet, utilizing the business solutions and the information system, and of utilizing the utilities, the storage and management of information.

The following Table 4 represents evaluation elements, evaluation items, and evaluation problem providing methods of the evaluation domains among the evaluation domains, corresponding to potential of information capability.

TABLE 3

Capability of information application

| Evaluation domains | Evaluation elements | Evaluation items | Detailed evaluation items | Evaluation problems |
|---|---|---|---|---|
| Capability of information application | Use of Information | OA | Capability of forming OA (Word processor, Spread sheet, Presentation) Capability of applying and utilizing OA | Application Test |
| | | Internet | Capability of searching and using information through the Internet Capability of searching information documents | |
| | Application of Information | Utilization of Solutions | Capability of using ERP, SCM, KMS, CRM, PDM, and HRM Capability of utilizing business solutions | |
| | | Utilization of Information system | Capability of using H/W, S/W, N/W, DB of system Capability of utilizing information system (B to E, B to C, B to B) | |
| | Management of Information | Utility | Capability of using utility (processing data, compression/decompression, recovery of system error, prevention and treatment of virus) Capability of setting and managing security | |
| | | Storage and Management | Capability of storing and sharing data Capability of utilizing DBMS and DW | |

TABLE 4

| Evaluation domains | Evaluation elements | Evaluation items | Detailed evaluation items | Evaluation problems |
|---|---|---|---|---|
| Potential of information capability | Information base ability | Degree | Degrees of Bachelor, Master, and Doctor in Information-related fields<br>Degrees of Bachelor, Master, Doctor in other fields | Questionnaire |
| | | Experience | Working experience in information-related fields (years of recent work experience)<br>Experience as a worker or a manager in information-related fields | |
| | Effort for development of information capability | Information Education | Completion of Information-related education (in and out enterprise)<br>Overseas Training related to information | |
| | | Authorized certification of qualification | Holding Information-related Patents<br>Holding various Information-related authorized certification of qualification | |
| | Capability of production of information knowledge | Publication in Magazines | Writing Information-related books, magazines<br>Publication of Information-related theses in various scientific conferences and journals | |
| | | Publication/ Lecture | Participation and Publication in various Information-related conferences, seminars, symposia<br>Lectures and educations related to information | |

Referring to Table 4, the potential of information capability is evaluated by the evaluation elements such as the information base ability, the effort of development of information capability, and the capability of production of information knowledge. Thus, the evaluation problems for evaluating the potential of information capability are provided in the form of the questionnaire of questioning the information-related degree, the career, the information education, the holding of the authorized certification of qualification, and achievement of producing the information knowledge.

The evaluation unit 132 evaluates the evaluation problems according to the score distribution logic when the terminal 200 responds to the evaluation problems provided by the evaluation problem provider 131 and outputs the evaluation result. On the other hand, the evaluation result is stored in the evaluation result database 120.

The evaluation index estimating unit 133 estimates the evaluation index by the evaluation domains using the evaluation result, and outputs the estimated evaluation index of information competency by applying the weight that is differently set according to the importance of the evaluation indices by the evaluation domains and summing up the same. The evaluation index estimating unit 133 stores the estimated evaluation index of the information competency together with the evaluation index by the evaluation domains in the evaluation result database 120. Here, the evaluation domain weight is differently set according to the evaluation groups and the weight is set to a high value at the core evaluation domains.

The evaluation result database 120 classifies the evaluation index by the evaluation domains of the evaluation targets and the evaluation index of information competency, contained in the evaluation target group, by the evaluation groups to store the same. This is for totaling the evaluation result of the evaluation targets contained in the evaluation target group by business departments or business position.

The following Table 5 represents the evaluation domain weight values as examples of a second evaluation group corresponding to directors of the strategy planning department.

TABLE 5

Weight values by evaluation domains/evaluation elements of directors of strategy planning department (Examples)

| Evaluation domains | Weight values | Evaluation elements | Weight values | Core Evaluation Domains |
|---|---|---|---|---|
| Information mind | 0.333 | Informationization plan | 0.393 | 0 |
| | | IT trend | 0.323 | |
| | | Sense of values for information | 0.284 | |
| Knowledge of Information Technology | 0.250 | Information base technology | 0.364 | 0 |
| | | Information application technology | 0.321 | |
| | | Information system | 0.315 | |
| Capability of information application | 0.199 | Information use | 0.383 | |
| | | Information application | 0.317 | |
| | | Information management | 0.301 | |
| Potential of information capability | 0.218 | Information base ability | 0.525 | |
| | | Development of information capability | 0.265 | |
| | | Production of information knowledge | 0.210 | |

Referring to FIG. 5, since the information mind and the knowledge of information technology are the core evaluation domains in the second evaluation group, the weight value of the information mind is 0.333 and the weight value of the knowledge of information technology is 0.250 so that it can be understood that the weight values are higher than the weight values of the capability of information application, 0.199 and the potential of information capability, 0.218. As such, the method of estimating the evaluation index of information competency by applying the weight differently according to the importance of the evaluation domains by the evaluation groups is to apply more features of the informationization to be core to the evaluation groups of the evaluation index of information competency. Thus, the information competency evaluation system according to an embodiment of the present invention can estimate the evaluation index of information competency (EIIC) proper to the features of informationization of business departments and business positions of the evaluation groups and can increase validity and reliability of the evaluation index of information competency.

In this embodiment of the present invention, the weight values can be differently applied by the evaluation domains as well as by the importance of the evaluation elements. In a case of differently applying the weight values by the evaluation elements, values, in which the evaluation results are classified by the evaluation elements and the respective weight values are applied to the evaluation result of the respective evaluation elements to sum up the same, become the evaluation indices in the evaluation domains. As such, the application of the weight according to the importance of the evaluation elements based on the features of business departments and business position increases the validity and reliability of the evaluation.

Figure 6:
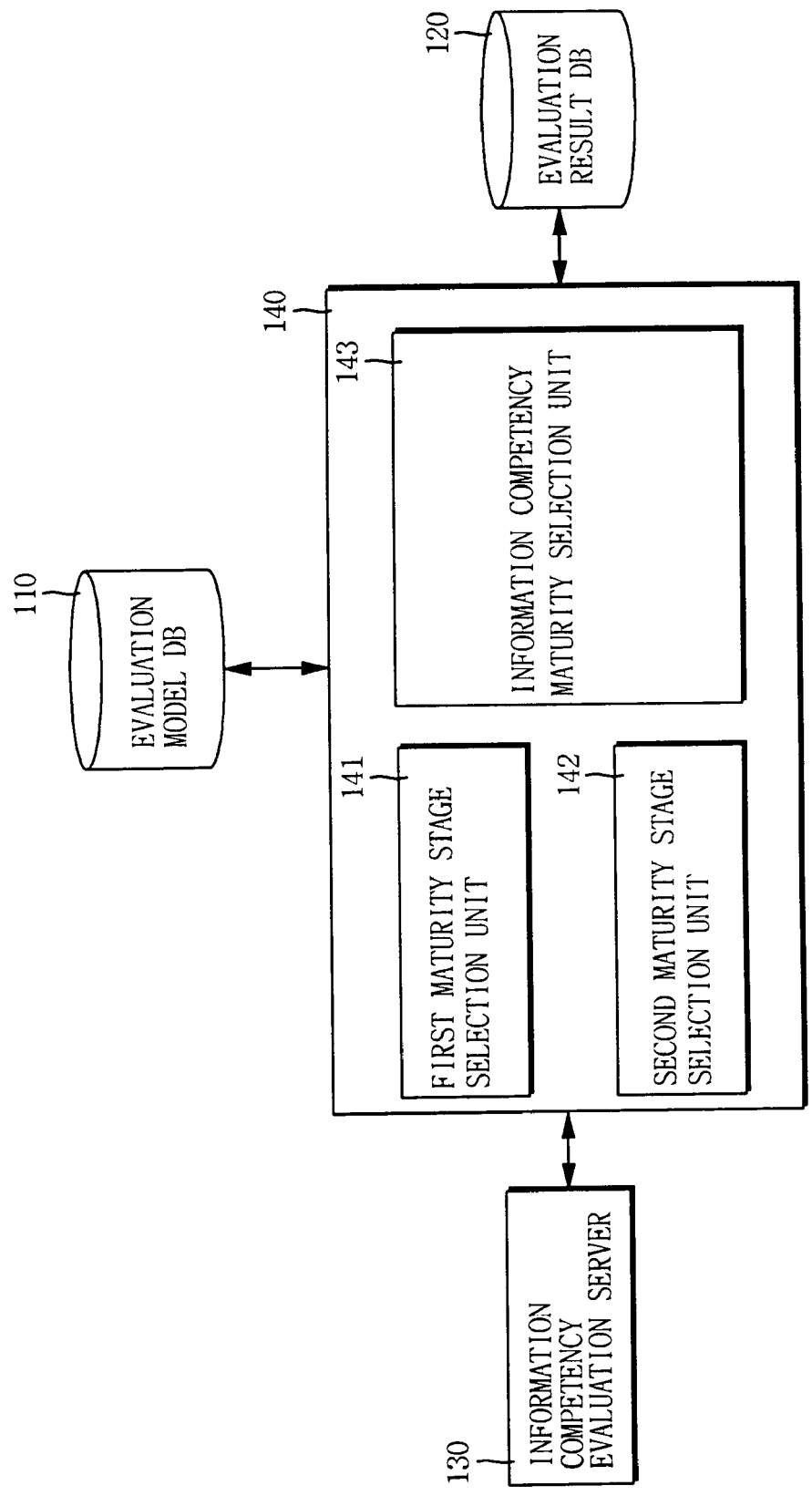
FIG. 6 is a schematic structural diagram illustrating an information competency maturity evaluation server according to an embodiment of the present invention.

FIG. 6 is a schematic structural diagram illustrating an information competency maturity evaluation server 140 according to an embodiment of the present invention.

Referring to FIG. 6, the information competency maturity evaluation server 140 includes a first maturity stage selection unit 141, a second maturity stage selection unit 142, and an information competency maturity selection unit 143.

The first maturity selection unit 141 selects a first maturity stage from a plurality of maturity stages using the evaluation index of information competency outputted by the information competency evaluation server 130. In order to select the maturity stage, the first maturity stage selection unit 141 refers to the information maturity model.

Figure 7A:
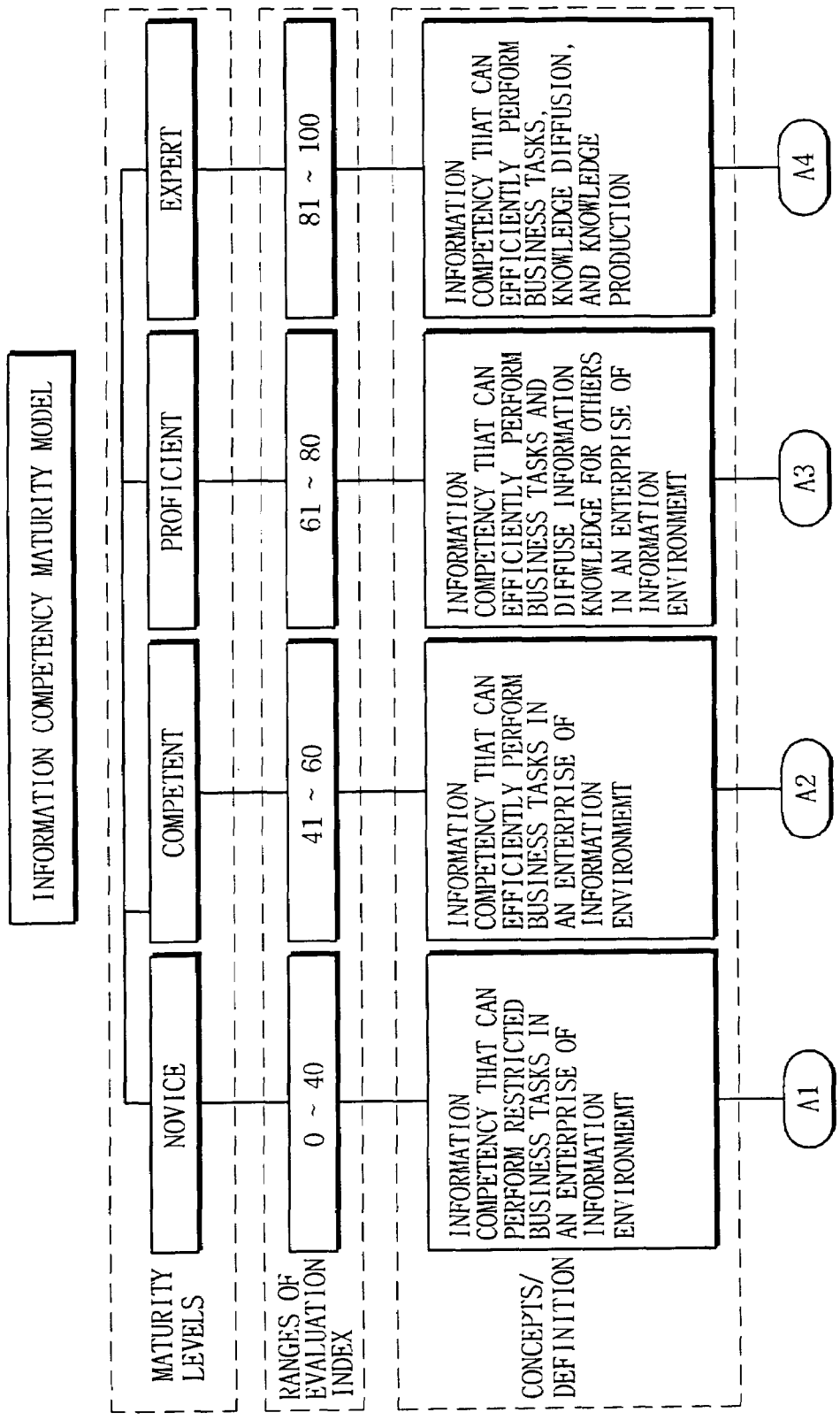
FIG. 7 is a schematic structure chart illustrating maturity stages in an information competency maturity model according to an embodiment of the present invention.
Figure 7B:
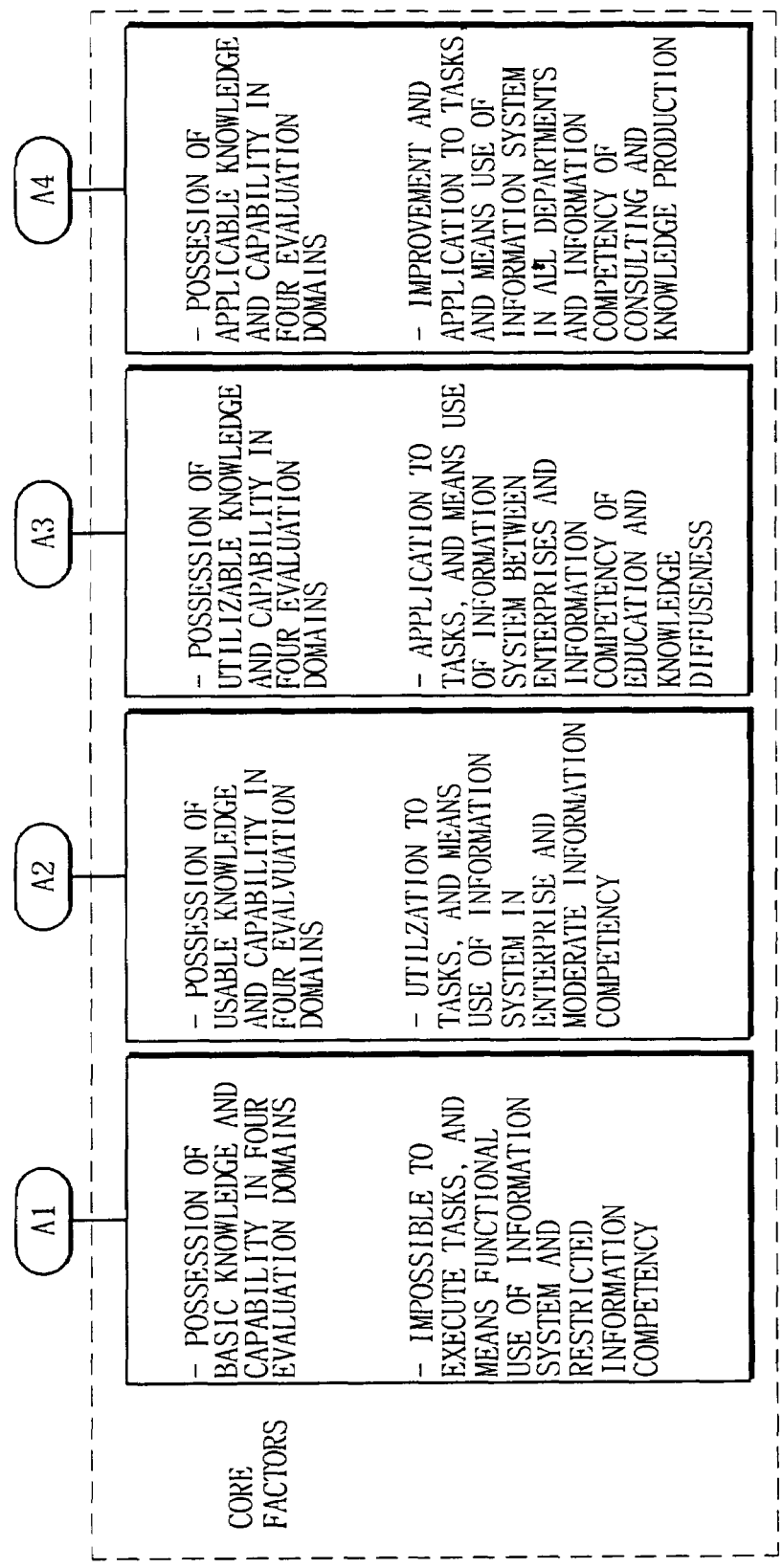

FIG. 7 is a schematic structure chart illustrating maturity stages in an information competency maturity model according to an embodiment of the present invention.

Referring to FIG. 7, the maturity stages in the information competency maturity model are classified by a novice level, a competent level, a proficient level, and an expert level. The novice level represents the lowest maturity stage and the expert level represents the highest maturity level. In a case of indicating the evaluation indices of information competency as a range of 0 to 100, the maturity stages can be set such that the novice level has a range of 0 to 40, the competent level has a range of 41 to 60, the proficient level has a range of 61 to 80, and the expert level has a range of 81 to 100. Here, although the evaluation indices of the novice level range within 40 and the evaluation indices of the rest range within respective 20, this is an example of values determined by opinions of experts and the survey, does not limit the present invention but illustrates the embodiment of the present invention. The respective ranges of the evaluation indices of the maturity stages are values determined by the ranges of the evaluation indices of information competency, the features of the evaluation target groups, and the features of the business departments and business position of the evaluation targets, and may be selected when designing the system.

FIG. 8 is a table illustrating an example in which the first maturity stage selection unit 141 determines a first maturity stage according to the embodiment of the present invention. The first maturity stage is determined based on the evaluation index of information competency.

Referring to FIG. 8, in the process of estimating the evaluation index of information competency of the evaluation target, firstly the weight values of the evaluation elements are multiplied to the evaluation values to estimate the evaluation indices of the evaluation elements when the evaluation results such as 70, 80, 60, . . . etc. are estimated by the evaluation items of the evaluation elements. For example of the estimation of the evaluation indices of information competency in the evaluation domains of the information mind, the evaluation indices of the evaluation elements are 27.50, 25.84, 17.04 . . . etc. Values, in which the estimated evaluation indices of the evaluation elements are summed up, are evaluation indices of the evaluation elements, 70.38, 63.64, 64.71, and 58.45, and the maturity stages of the evaluation domains are determined by the evaluation indices. For example, the evaluation index of the evaluation domain for the information competency is 70.38, and the maturity stage corresponding to the evaluation domain of the information competency is the proficient level.

When the evaluation indices of the evaluation domains are determined, the weight values corresponding to the respective evaluation domains are multiplied to the evaluation indices of the evaluation domains and the multiplication results (26.44, 15.91, 12.88, and 12.74 in FIG. 8) are summed up to estimate the evaluation index of information competency, 67.97. The first maturity stage selection unit 141 determines the first maturity stage of the evaluation target as the proficient level using the evaluation index of information competency, 67.97.

The second maturity stage selection unit 142 selects the second maturity stage using the evaluation index corresponding to the core evaluation domain among the evaluation indices of the evaluation domains, and stores information on the selected second maturity stage in the evaluation result database 120. Referring to FIG. 8, since the second maturity stage selection unit 142 uses only the evaluation index of the core evaluation domain for the determination of the second maturity stage, the core evaluation domains are the information mind and the knowledge of information technology (in a case of directors of the strategy planning department) and the evaluation indices of the core evaluation domains are respectively 70.38 and 63.64 so that the maturity stage of the lower evaluation index, 63.64 of the core evaluation domains corresponds to the proficient level and thus the second maturity stage is the proficient level.

The information competency maturity selection unit 143 uses the first maturity stage (maturity stage according to the evaluation index of information competency) and the second maturity stage (maturity stage according to the core evaluation domains) and finally determines the information competency maturity stage representing the maturity level of the evaluation target. The selecting method selects the first maturity stage when the first maturity stage is lower than or equal to the second maturity stage and a maturity stage lower by one step than the first maturity stage in another case. Referring to FIG. 8, since the first maturity stage is identical to the second maturity stage in view of the maturity level, the final maturity stage of the evaluation target becomes the proficient level.

As described above, when the evaluation indices of the evaluation domains, the evaluation indices of information competency, and the maturity stage of information competency for the evaluation target are determined, the information competency analysis server 160 analyzes and provides the personal information competency based on the determination.

Figure 9:
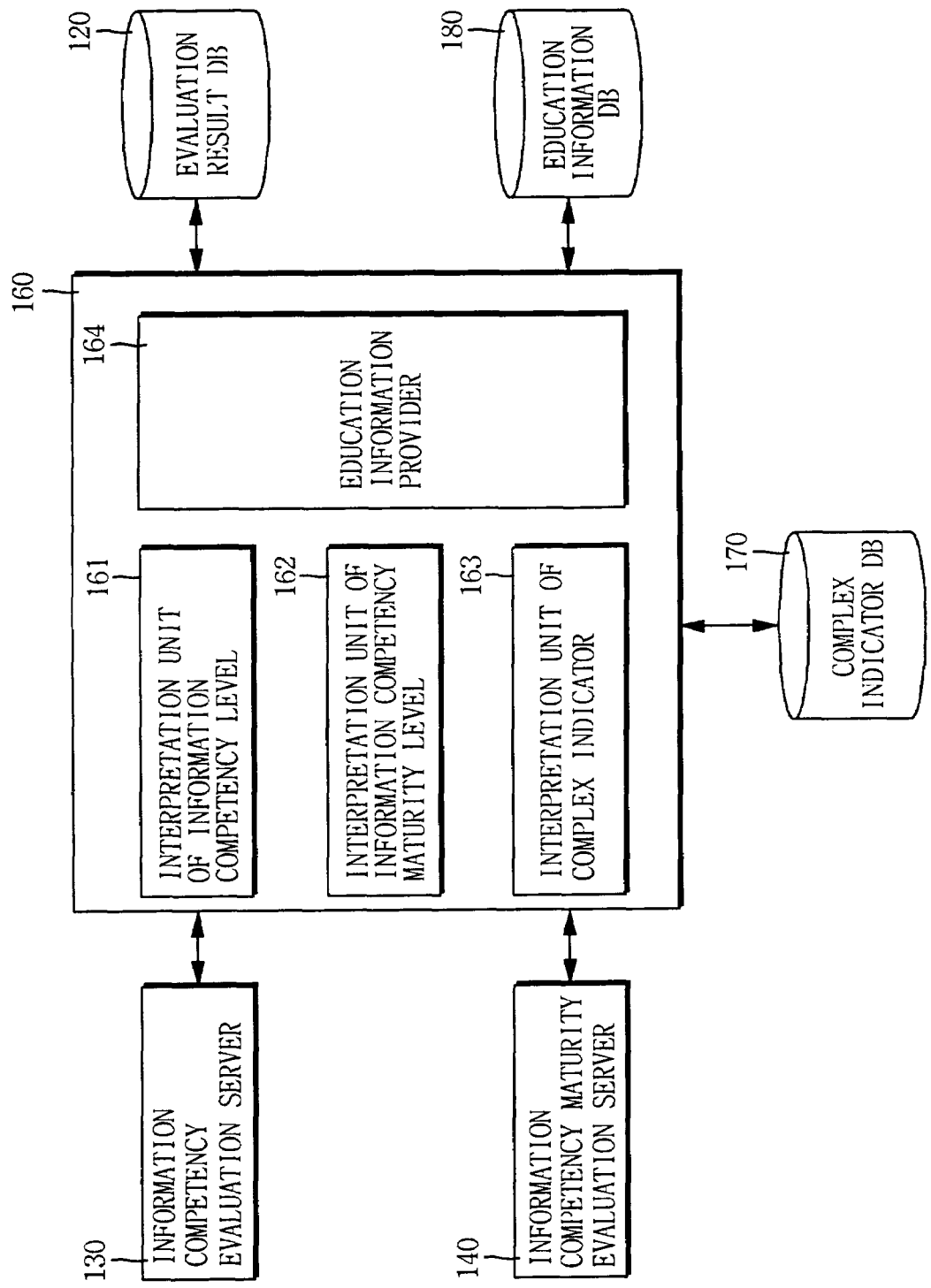
FIG. 9 is a schematic structural diagram illustrating an information competency analysis server according to an embodiment of the present invention.

FIG. 9 is a schematic structural diagram illustrating an information competency analysis server 160 according to the embodiment of the present invention.

Referring to FIG. 9, the information competency analysis server 160 includes an interpretation unit of information competency level 161, an interpretation unit of information competency maturity level 162, a interpretation unit of complex indicator 163, and an education information provider 164.

The interpretation unit of information competency level 161 uses the evaluation indices and the evaluation indices of information competency for the evaluation domains and the evaluation elements of the evaluation target to analyze which level of the information competency of the evaluation target positions in the entirety of evaluation target groups and to output the analyzed result, and provides the analyzed result to the evaluation target via the terminal 200. The interpretation unit of information competency level 161 estimates an average evaluation index of information competency for the business departments and the business position of the members who belong to the evaluation target group, compares the average evaluation index with the evaluation index of information competency of the evaluation target, and delivers the compared result to the terminal 200 of the evaluation target.

To this end, the interpretation unit of information competency level 161 reads the evaluation indices for the evaluation domains and the evaluation indices of information competency of the members which are classified by the evaluation groups and stored in the evaluation result database 120 in which the evaluation indices of information competency of the evaluation target group. The interpretation unit of information competency level 161 obtains an average evaluation index of information competency for the evaluation domains and an average evaluation index of information competency of the entire evaluation group using the read evaluation indices for the evaluation domains and the evaluation indices of information competency of the members, and estimates average evaluation indices of the evaluation domains and average evaluation indices of information competency by the business departments and the business position. Based on the estimation, the interpretation unit of information competency level 161 compares the average evaluation indices of the evaluation domains for the business departments and the business position and the average evaluation indices of information competency of the entire evaluation groups, with the evaluation index of the evaluation domains and the evaluation index of information competency for the evaluation target, and may provide the evaluation index of the evaluation domains and the evaluation index of information competency for the evaluation target as well as the estimated average evaluation indices of the evaluation domains for the business departments and the business position and the estimated average evaluation indices of information competency of the entire evaluation groups in the form of graph or chart to the terminal 200.

The interpretation unit of information competency maturity level 162 diagnoses the maturity of information competency of the evaluation target based on the maturity stage of information competency and provides the diagnosis to the evaluation target via the terminal 200. The interpretation unit of information competency maturity level 162 may simply provide the information competency maturity stage of the evaluation target to the terminal 200, and may provide the analyzed maturity of the evaluation target based on the maturity stage to the evaluation target. The interpretation unit of information competency maturity level 162 provides a distributional graph of the maturity stages of other members in the entire evaluation group so that the evaluation target can check which level of his/her maturity stage is in the evaluation target group.

FIGS. 10A, 10B, 10C, 10D, and 10E are charts illustrating examples of average evaluation indices and average evaluation indices of information competency of entire, business departments, and business position, for worker of the development and management department, which are provided to the evaluation target by the information competency analysis server 160 according to an embodiment of the present invention.

Figure 10A:
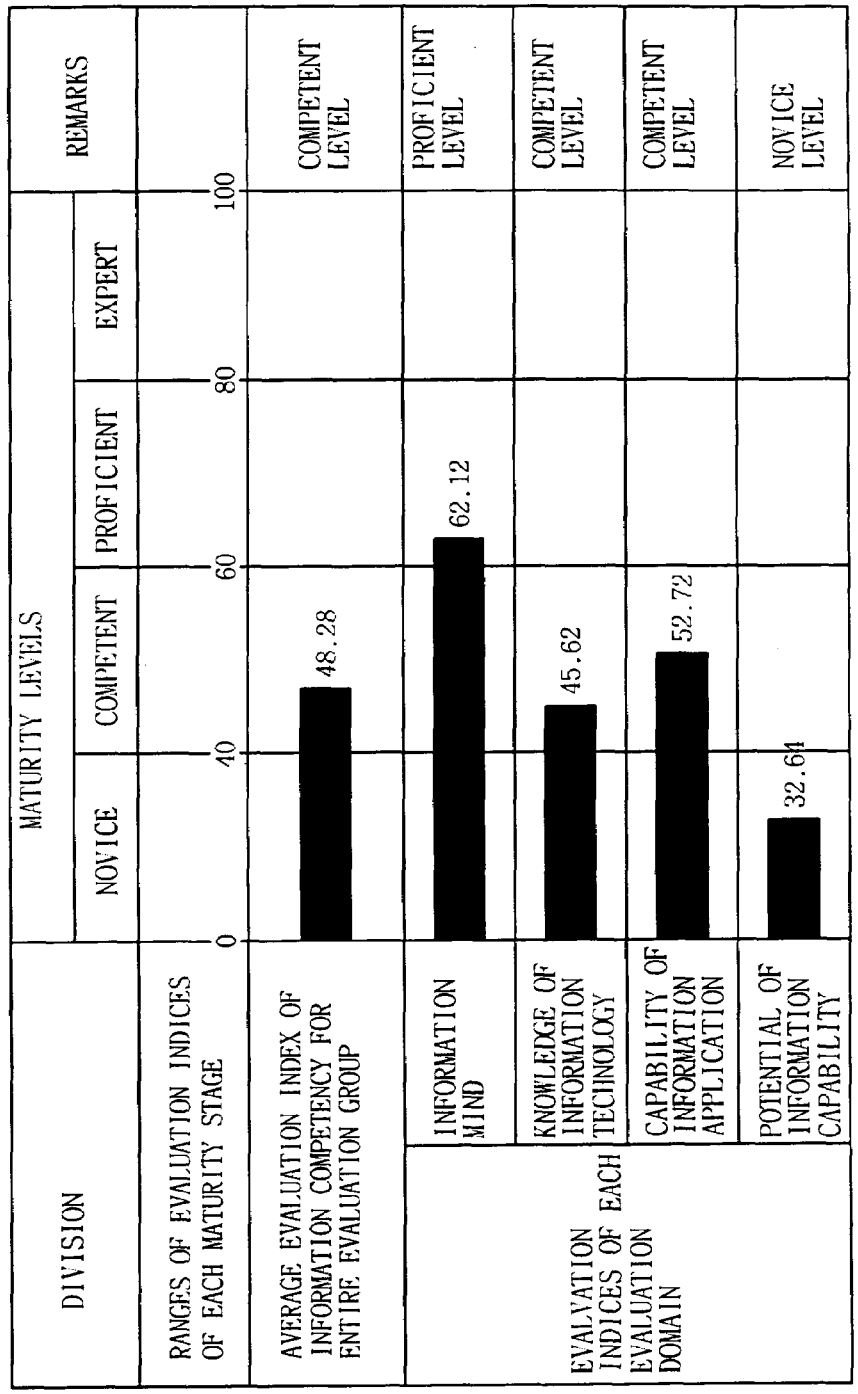
FIG. 10A is a chart illustrating examples of an average evaluation index of respective evaluation domains and an average evaluation index of information competency (EIIC) for only an evaluation group among evaluation target groups of performing administration support according to an embodiment of the present invention.
Figure 10B:
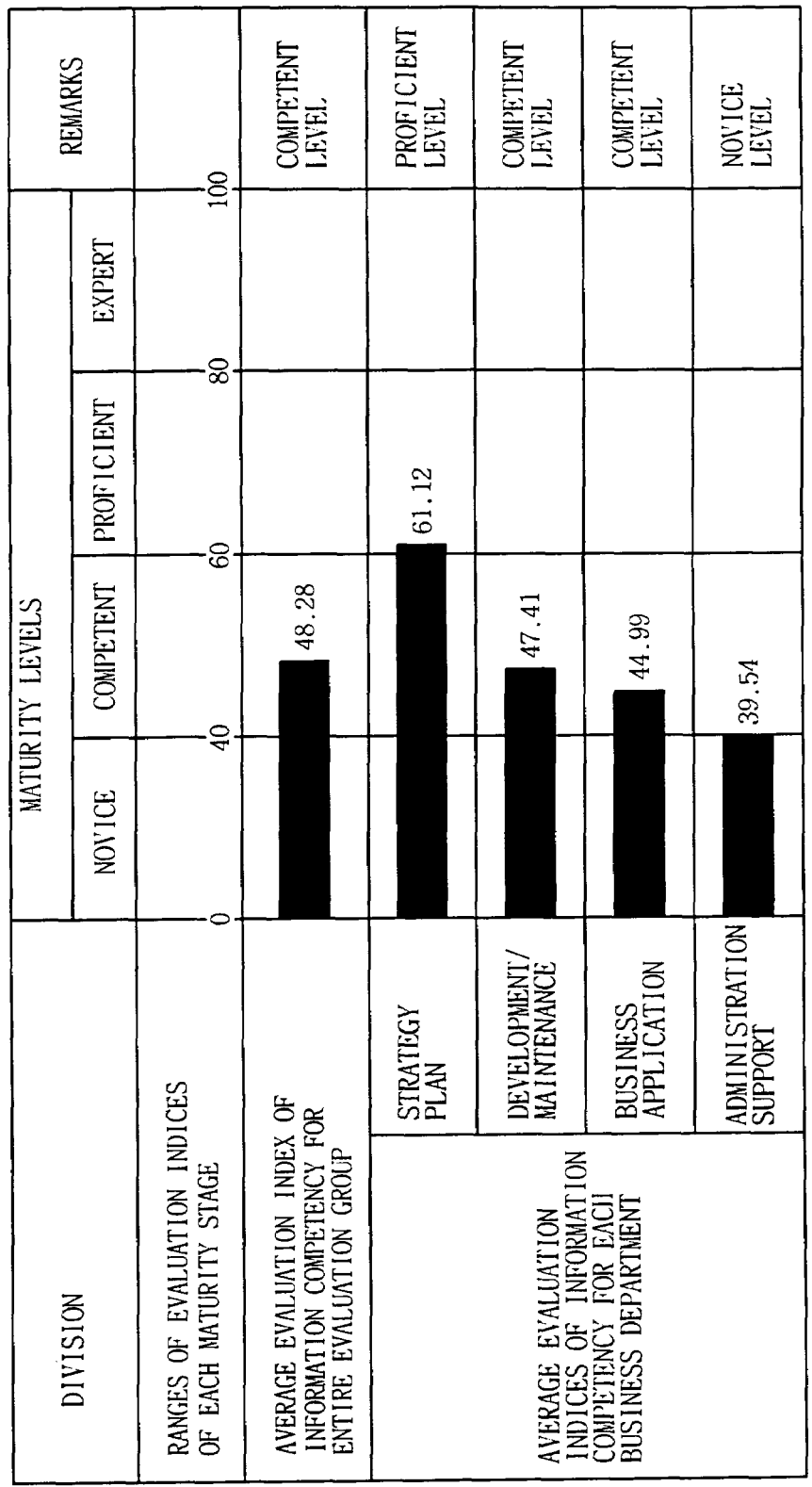
FIG. 10B is a chart illustrating examples of an average evaluation index of respective evaluation domains and an average evaluation index of information competency for a worker among the evaluation target groups according to an embodiment of the present invention.
Figure 10C:
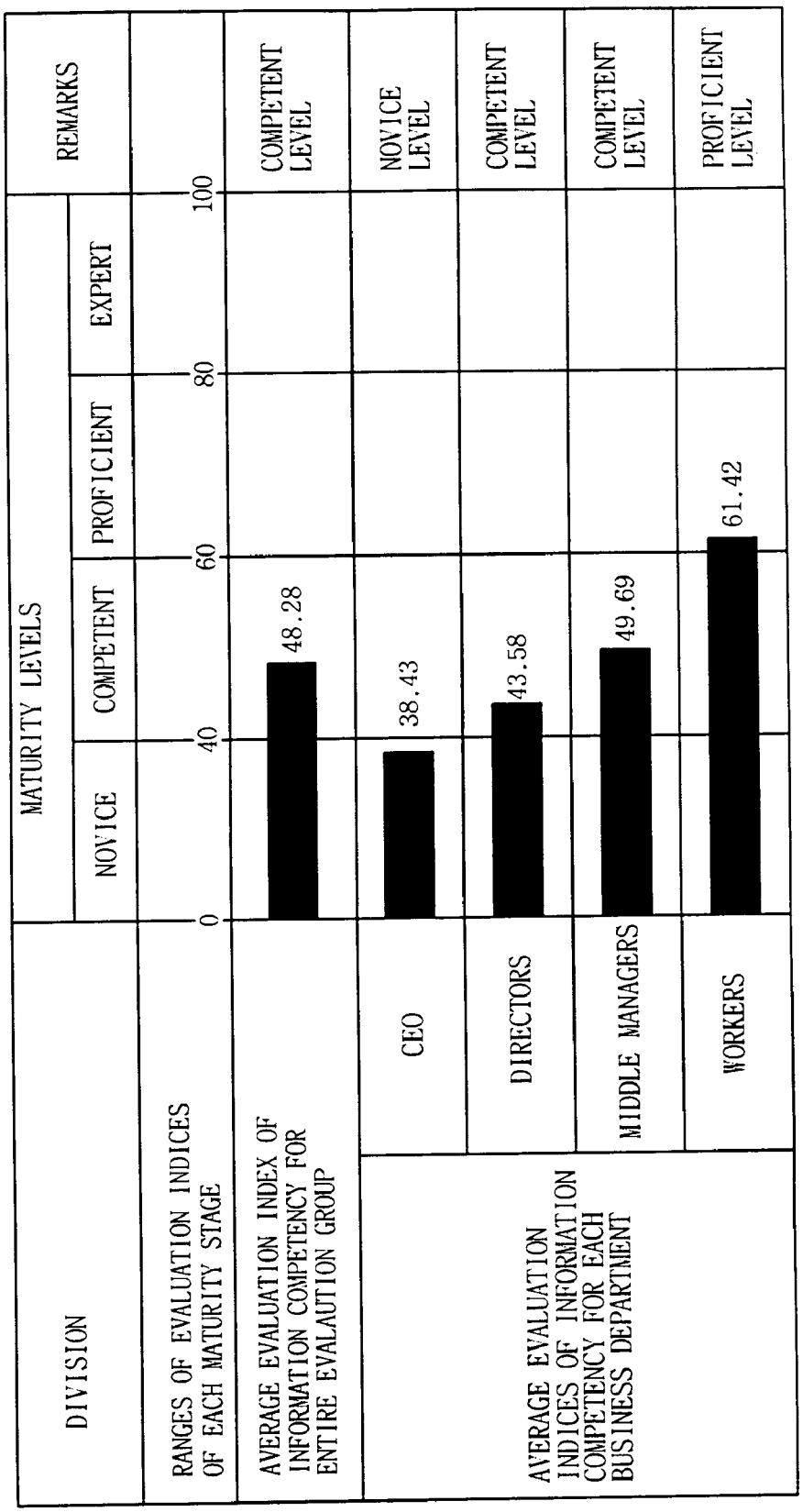
FIG. 10C is a chart illustrating examples of an average evaluation index of respective evaluation domains and an average evaluation index of information competency for entire evaluation groups according to an embodiment of the present invention.
Figure 10E:
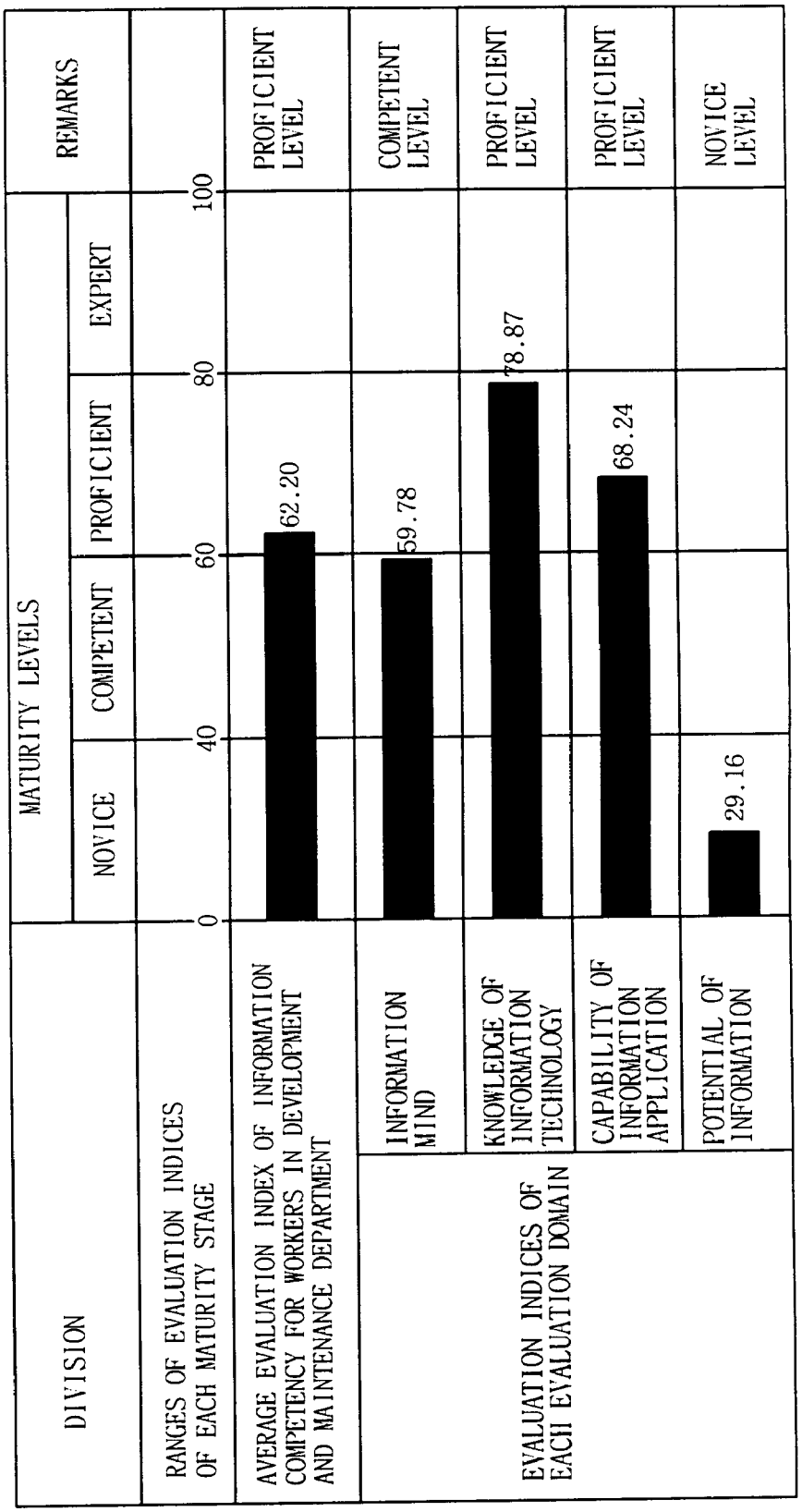
FIG. 10E is a chart illustrating examples of an average evaluation index of respective evaluation domains and an average evaluation index of information competency for a worker of the development and management department according to an embodiment of the present invention.

FIG. 10A illustrates average evaluation indices of respective evaluation domains and average evaluation indices of information competency (EIIC) for entire evaluation groups, FIG. 10B illustrates average evaluation indices of information competency by the business department for members, FIG. 10C illustrates average evaluation indices of information competency by the business position for members, FIG. 10D illustrates an average evaluation index of information competency by the business departments for members, FIG. 10C illustrates average evaluation indices and average evaluation indices of information competency by the evaluation domains for members of the development and management department, and FIG. 10E illustrates average evaluation indices and average evaluation indices of information competency by the evaluation domains for members of the development and management department, corresponding to the worker.

For example, when the evaluation target performs a task of development and management and an evaluation index of information competency of an evaluation target as a worker is 62.20, since the average evaluation index of information competency of the entire evaluation groups is 48.28 as illustrated in FIG. 10A, the level of the information competency of the evaluation target can be determined higher than the average evaluation index of information competency of the evaluation group. Since, as illustrated in FIGS. 10B and 10C, an average evaluation index of information competency of members who perform the same task as that of the evaluation target (development and management) is 47.41 and an average evaluation index of information competency of members corresponding to the worker is 61.42, the evaluation target exhibits a level of information competency higher than levels of the average information competency of the members performing the same task as that of the evaluation target and having the same business position as that of the evaluation target.

Figure 11:
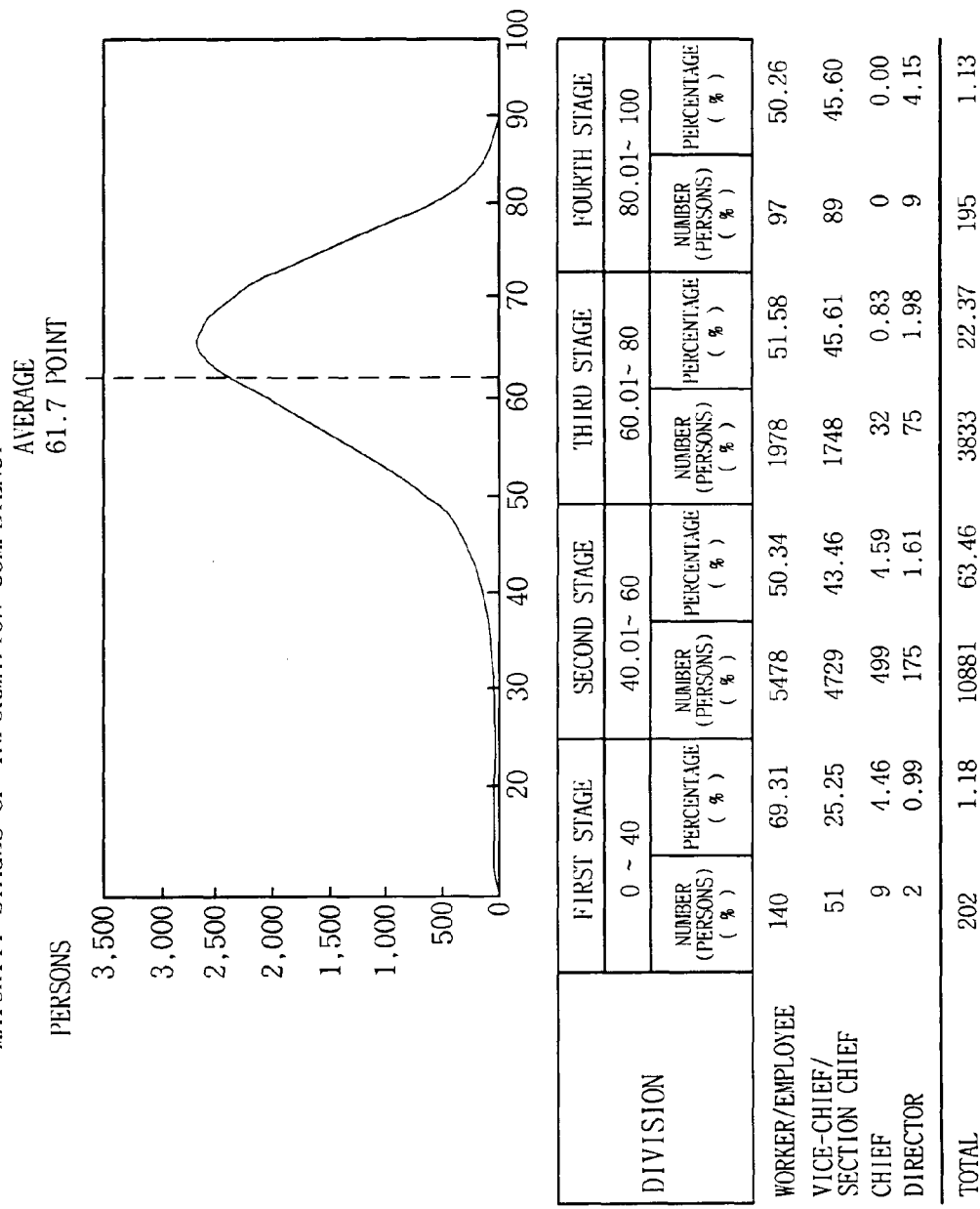
FIG. 11 is a chart illustrating an example of a distribution graph of the information competency maturity stages for evaluation targets within the evaluation target groups, which are provided to the evaluation targets according to an embodiment of the present invention.

FIG. 11 is a chart illustrating an example of a distribution graph of the information competency maturity stages for the evaluation targets within the evaluation target groups, which are provided to the evaluation targets by the interpretation unit of information competency maturity level 162, according to an embodiment of the present invention. Referring to FIG. 11, it can be understood that a point where the maturity stages of the evaluation targets of the evaluation target group are most widely distributed is a competent stage where 10,881 persons are distributed.

Meanwhile, the interpretation unit of complex indicator 163 analyzes which information competency the evaluation target exhibits for the respective complex indicators based on the complex indicators and delivers the information competency of the evaluation target to the terminal 200. In order to analyze the personal information competency of the evaluation target based on the complex indicators, the interpretation unit of complex indicator 163 classifies the evaluation problems which are provided to the evaluation target by the items corresponding to the complex indicators and sums up the evaluation results for the corresponding items to express the evaluation results with the complex indicators.

Here, the complex indicators are typical and implicative principal indicators for determining the information competency of the evaluation target are expressed by representative items in which the evaluation elements of four evaluation domains are implicated. The interpretation unit of complex indicator 163 analyzes the information competency based on the complex indicators to output the analyzed result.

The following Table 6 represents an example of the complex indicators where the complex indicators are divided into common complex indicators and core complex indicators with high importance.

TABLE 6

Complex indicators of personal information competency

| Complex indicators of personal informationization | Sub-evaluation elements and items |
| --- | --- |
| 1. Indicator of understanding of informationization plan | Understanding of informationization strategy and plan, Understanding of informationization implementation plan, Level of business utilization |
| 2. Indicator of IT interest | Acceptability and propagation of IT |
| 3. Indicator of sense of value for information | Recognition for information, Etiquette related to Information, and Understanding of Laws and institutions for information |
| 4. Indicator of Information base knowledge | Knowledge for H/W, S/W, N/W, and DB |
| 5. Indicator of e-Business knowledge | Knowledge for e-Business, Electronic commerce, and m-Business |

TABLE 6-continued

Complex indicators of personal information competency

| Complex indicators of personal informationization | Sub-evaluation elements and items |
| --- | --- |
| 6. Indicator of information system knowledge within enterprise | Knowledge for H/W, S/W, N/W, and DB of operating systems |
| 7. Indicator of understanding for information institutions/regulations within enterprise | Knowledge for information protection, information protection systems, and institutions and regulations |
| 8. Indicator of OA application ability | Ability of using word processor, spreadsheet, and presentation |
| 9. Indicator of Internet/Homepage application | Ability of searching information on the Internet, and utilizing internal home page |
| 10. Indicator of solution application ability | Ability of utilizing ERP, SCM, CRM, KMS, and HRM etc. |
| 11. Indicator of information system business application | Capability of applying information systems to business (B2E, B2B, B2C) |
| 12. Indicator of information management ability | Capability of using utilities, and establishing and managing of security |
| 13. Indicator of information base ability | Degrees, Years of work experience, and certificates related to information |
| 14. Indicator of information education & training | Overseas training/education, education in and out of enterprise related to information |
| 15. Indicator of information knowledge production | Publications/Participations of papers in domestic and foreign scientific conferences and journals, Publication of information books, Publication of articles in Magazines, and lectures/educations related to information |

In the items listed in Table 6, the indicator for understanding of informationization plan, the indicator of e-Business knowledge, the indicator of ability of utilizing solutions, the indicator of information education, and the indicator of producing information knowledge correspond to the core complex indicators.

Figure 12A:
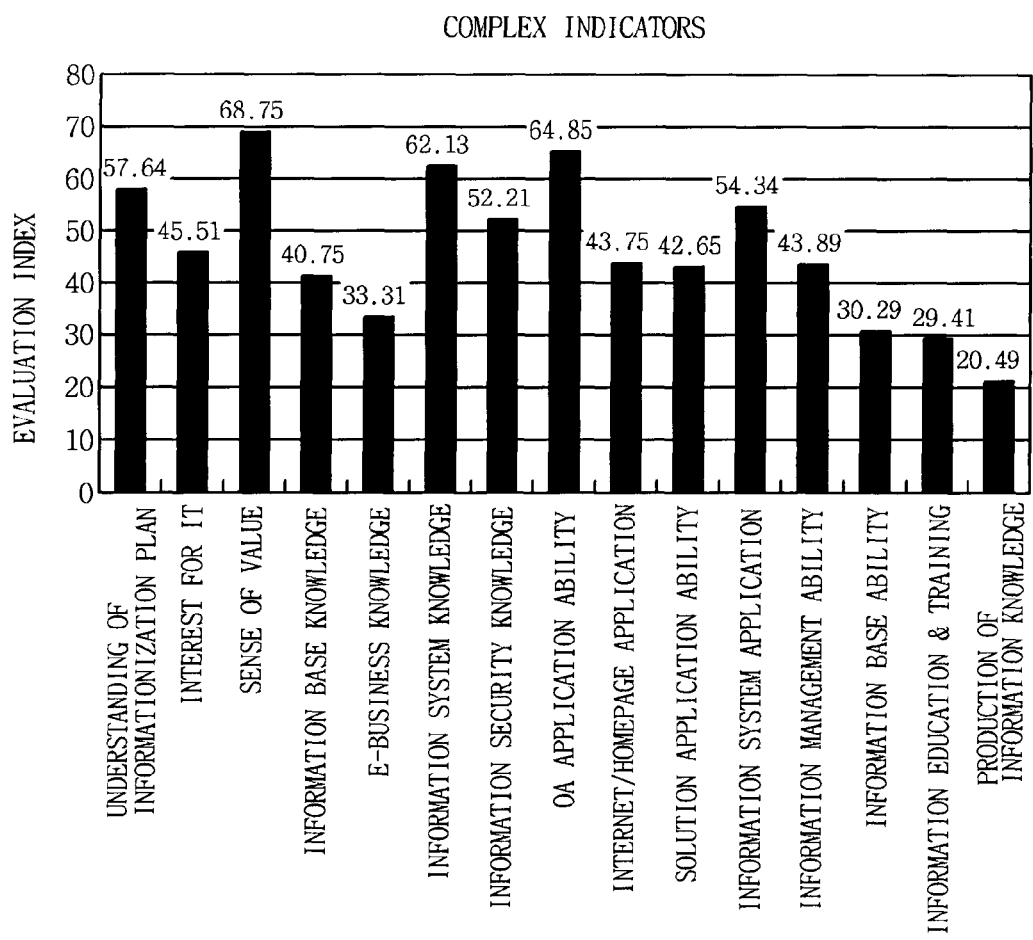
FIG. 12A is a graph illustrating an example in which an interpretation unit of complex indicator provides an information competency analyzing result based on common core complex indicators to the evaluation target, according to an embodiment of the present invention.
Figure 12B:
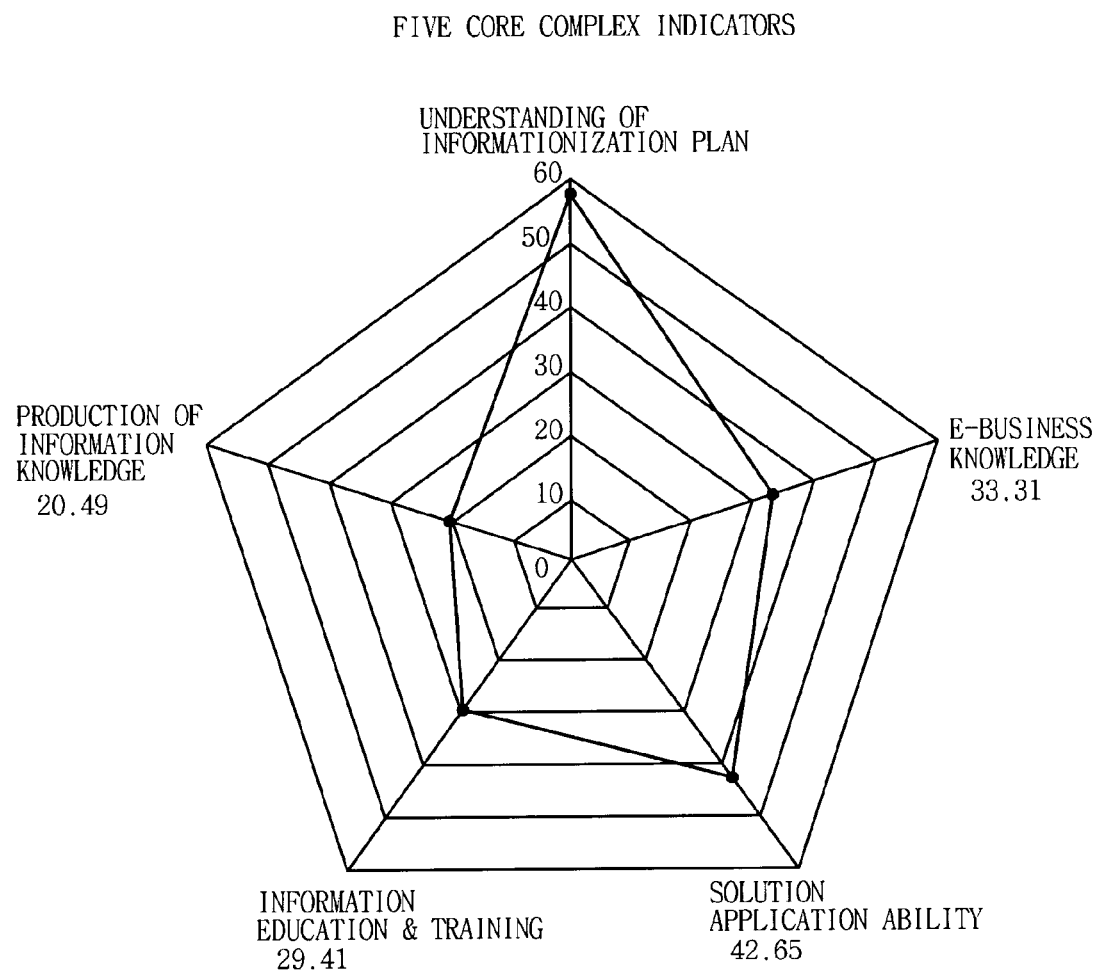
FIG. 12B is a chart illustrating an example in which an interpretation unit of complex indicator provides an information competency analyzing result based on core complex indicators to the evaluation target, according to an embodiment of the present invention.

FIGS. 12A and 12B are graphs illustrating examples in which the interpretation unit of complex indicator 163 provides information competency analyzing results based on the complex indicators to the evaluation group, according to the embodiment of the present invention, wherein FIG. 12A illustrates the result analyzed based on the common complex indicators and FIG. 12B illustrates the result analyzed based on five core complex indicators.

Referring to FIGS. 12A and 12B, the interpretation unit of complex indicator 163 depicts a level of the information competency of the evaluation target by the respective complex indicators in percentage. The method of providing the analyzed results using the complex indicators as illustrated in FIGS. 12A and 12B does not limit the present invention, but is illustrated as an example of the method of analyzing and providing the information competency of the evaluation target, and thus can be modified according to features of the evaluation target group when designing the system.

The education information provider 164 reads and provides the education information which is needed to improve the information competency of the evaluation target based on the maturity stage and the evaluation index of information competency of the evaluation target, from the education information database 180. The education information database 180 stores the education information needed in the respective maturity stages for the evaluation groups, and the education information provider 164 reads the education information proper to the maturity stage of information competency of the evaluation group containing the evaluation target and provides the same to the evaluation target.

Hereinafter, a method of evaluating information competency carried out by the information competency evaluation system 100 according to an embodiment of the present invention will be described with reference to the accompanying drawings.

Figure 13:
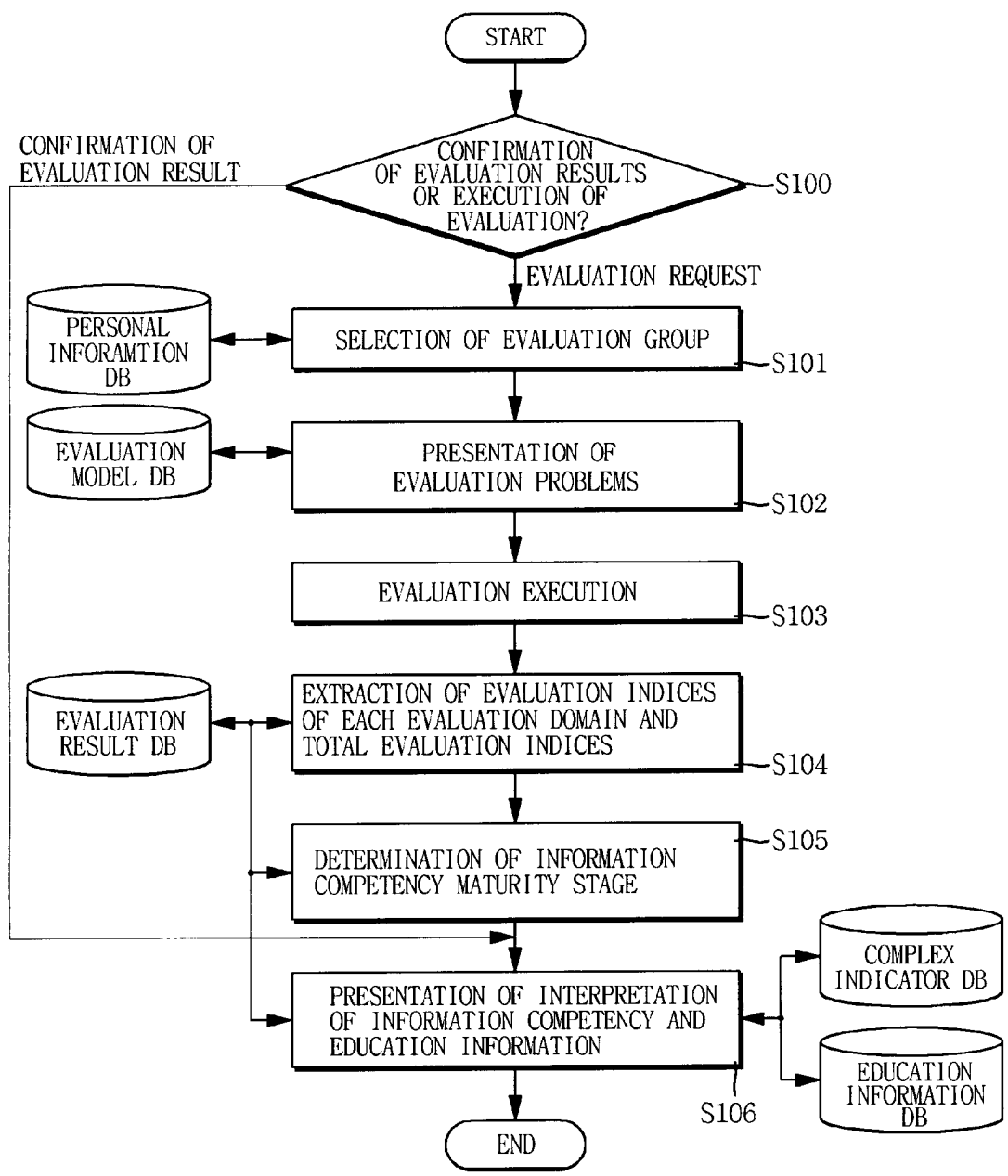
FIG. 13 is a flowchart illustrating a method of evaluating information competency in the system for evaluating information competency according to an embodiment of the present invention.

FIG. 13 is a flowchart illustrating a method of evaluating information competency in the system 100 for evaluating information competency according to the embodiment of the present invention.

Referring to FIG. 13, when an evaluation request is received from the terminal 200 of the evaluation target (S100), firstly the information competency evaluation server 130 selects an evaluation group corresponding to an evaluation target according to the business department and position of the evaluation target (S101). In this embodiment, the evaluation groups are classified into thirteen evaluation groups by business departments and business position and different problems are applied to the respective evaluation groups.

When the evaluation group is determined, the information competency evaluation server 130 reads the evaluation problems corresponding to the selected evaluation group from the evaluation model database 110 and provides the evaluation problems to the evaluation target (S102). After that, when the evaluation target responds to the evaluation problems through the terminal 200, the information competency evaluation server 130 evaluates the response using the score distribution logic (S103). After the evaluation, the information competency evaluation server 130 applies the weight values to the evaluation elements of the evaluation domains to estimate the evaluation indices for the evaluation domains, applies the weight to the evaluation indices for the evaluation domains, and sums up the estimated values to estimate the evaluation index of information competency (S104). The estimated evaluation index for evaluation domains and the evaluation index of information competency are stored in the evaluation result database 120.

When the evaluation index for the evaluation domains and the evaluation index of information competency are estimated, the information competency maturity evaluation server 140 selects the information competency maturity stage of the evaluation target using the estimated indices (S105), and stores information of the same in the evaluation result database 120.

When the information competency maturity stage is determined, the information competency analysis server 160 analyzes the information competency of the evaluation target based on the evaluation index for the evaluation domains, the evaluation index of information competency, and the information competency maturity stage, reads a complex indicator representing the information competency from the complex indicator database 170 to analyze the information competency of the evaluation target using the read complex indicator. As such, the analyzed result of the information competency of the evaluation target is transferred to the terminal 200 of the evaluation target together with the education information read from the education information database 180 in correspondence to the analyzed result of the information competency (S106).

The analyzed result of the information competency and the education information are stored in the evaluation result database 120, and after that, the information competency analysis server 160 reads the information competency analyzed result and the education information from the evaluation result database 120 to provide the data when the evaluation target requests the evaluation result via the terminal 200.

Figure 14A:
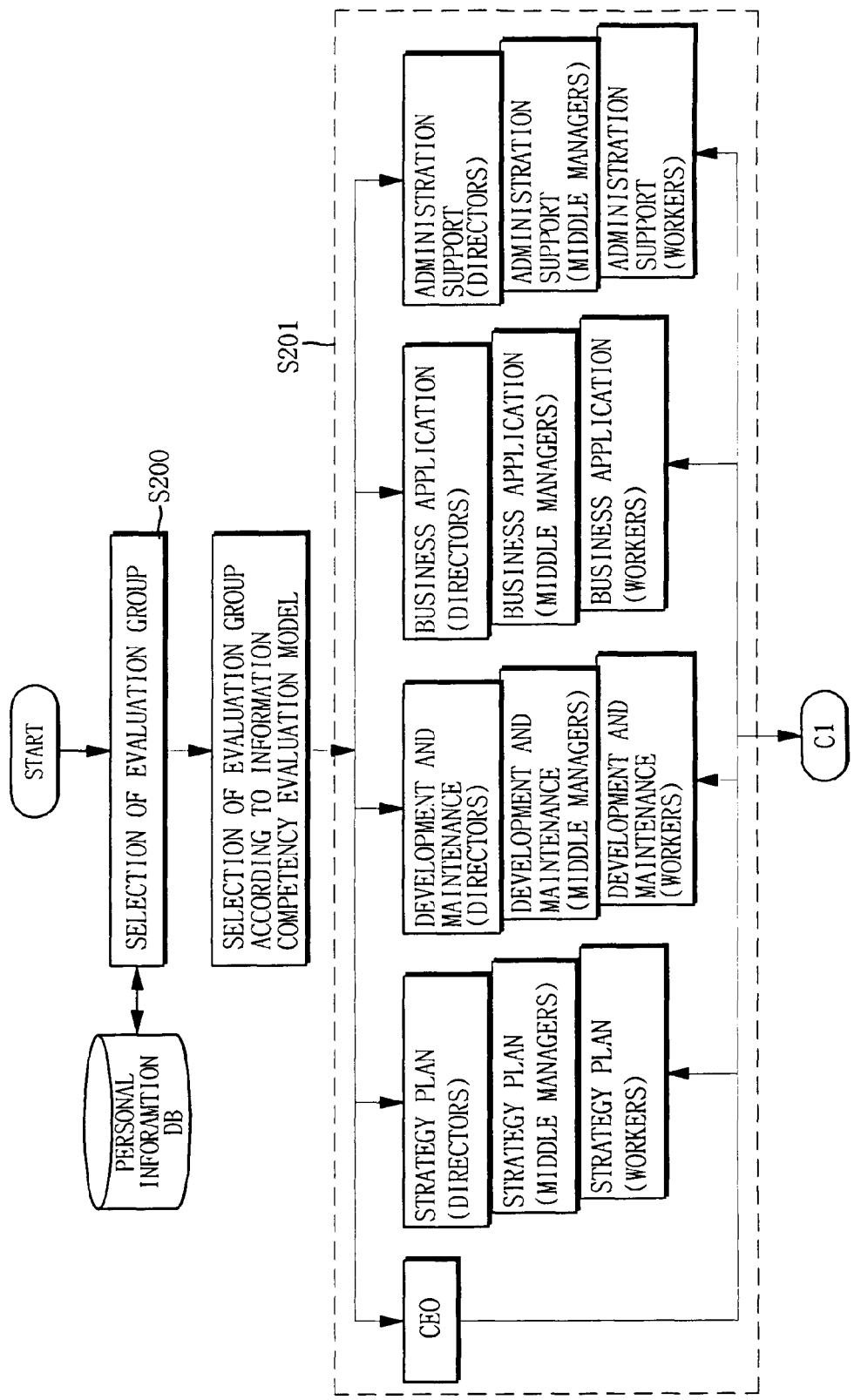
FIG. 14 is a flowchart illustrating a method of estimating an information competency evaluation index according to an embodiment of the present invention.
Figure 14B:
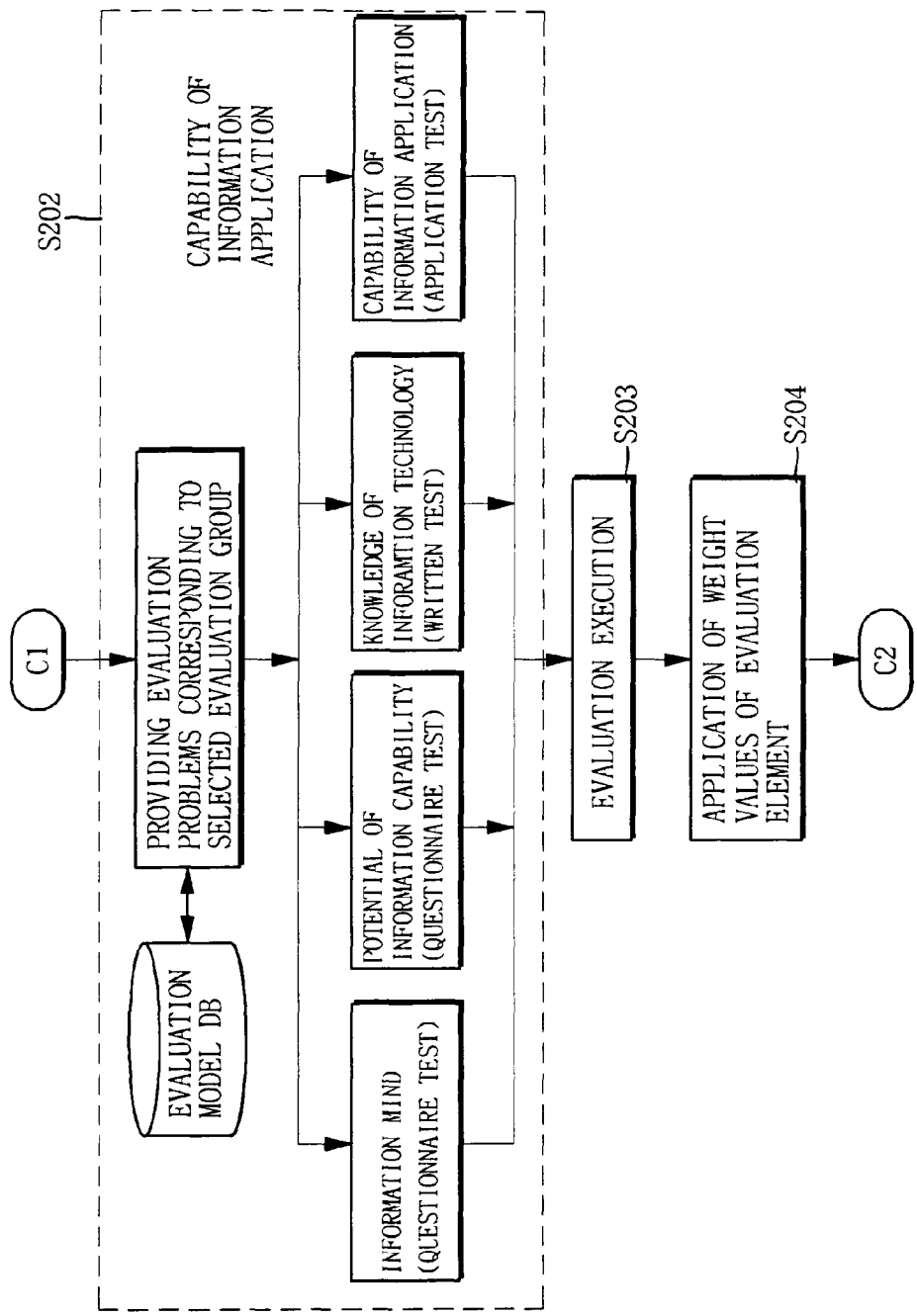
Figure 14C:
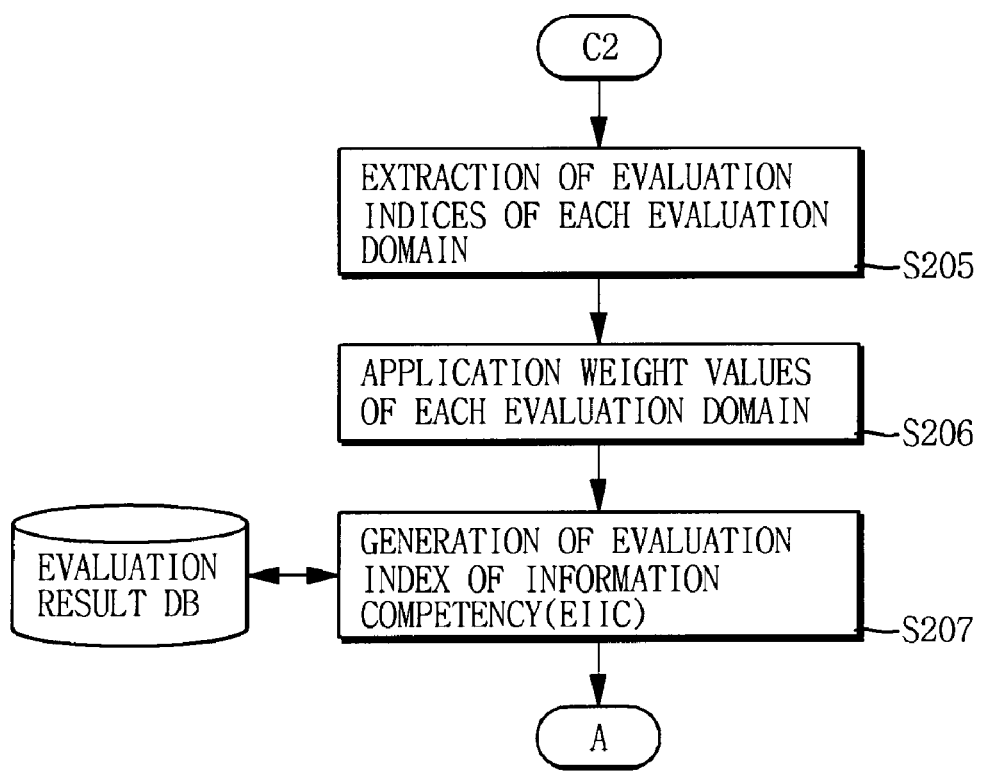
Figure 15A:
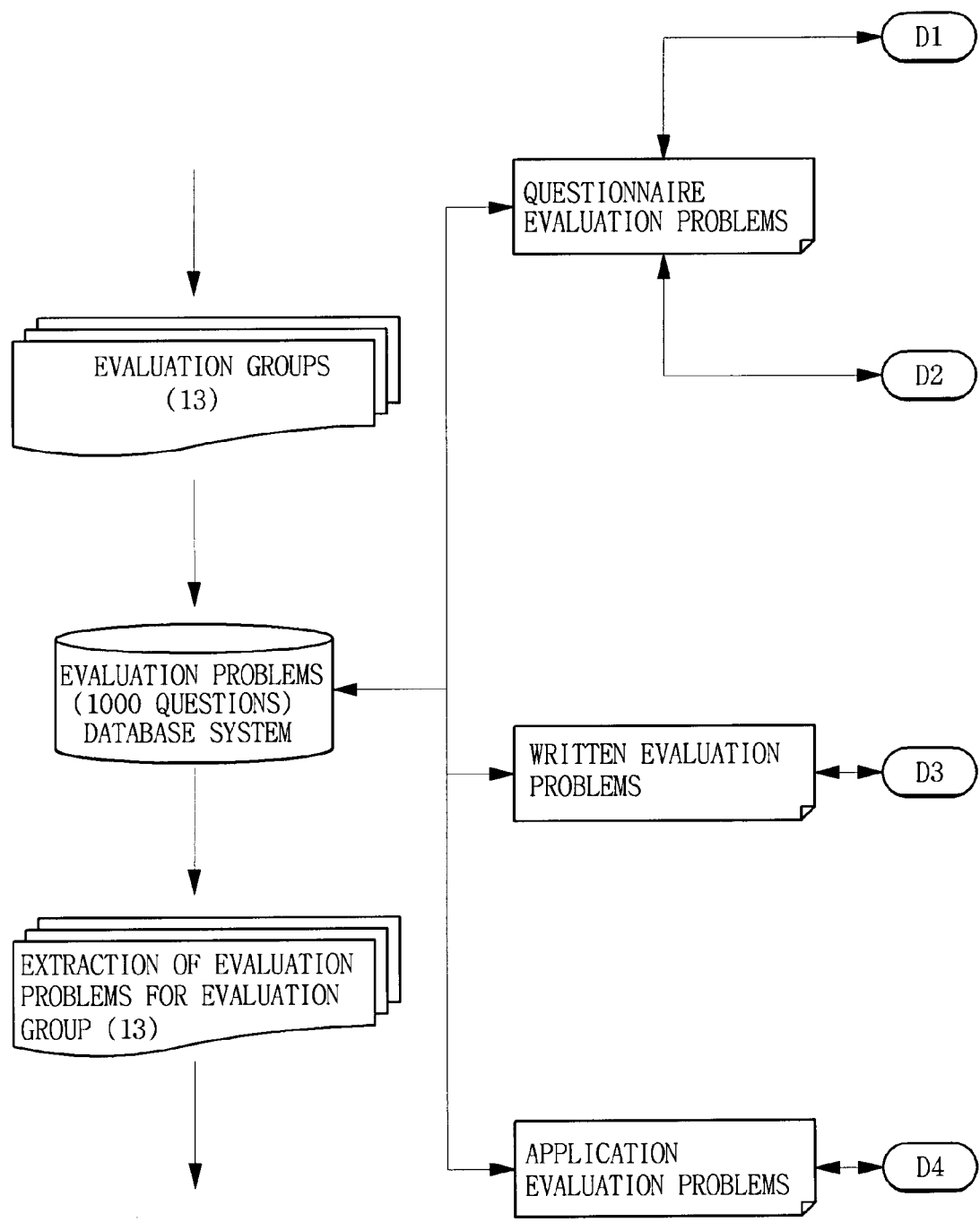
FIG. 15 is a view illustrating an example of an evaluation problem corresponding to one evaluation group according to an embodiment of the present invention.
Figure 15B:
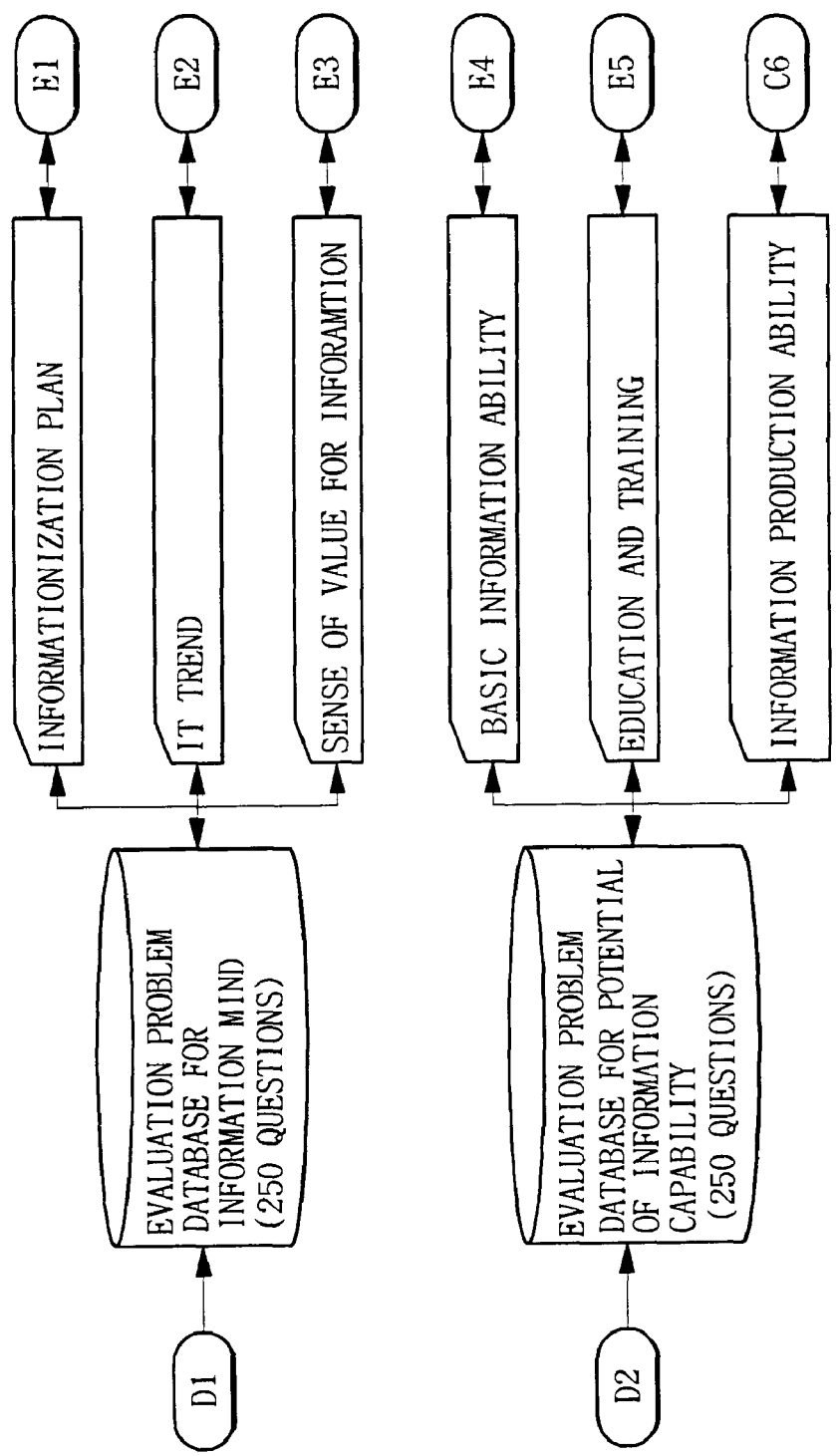
Figure 15C:
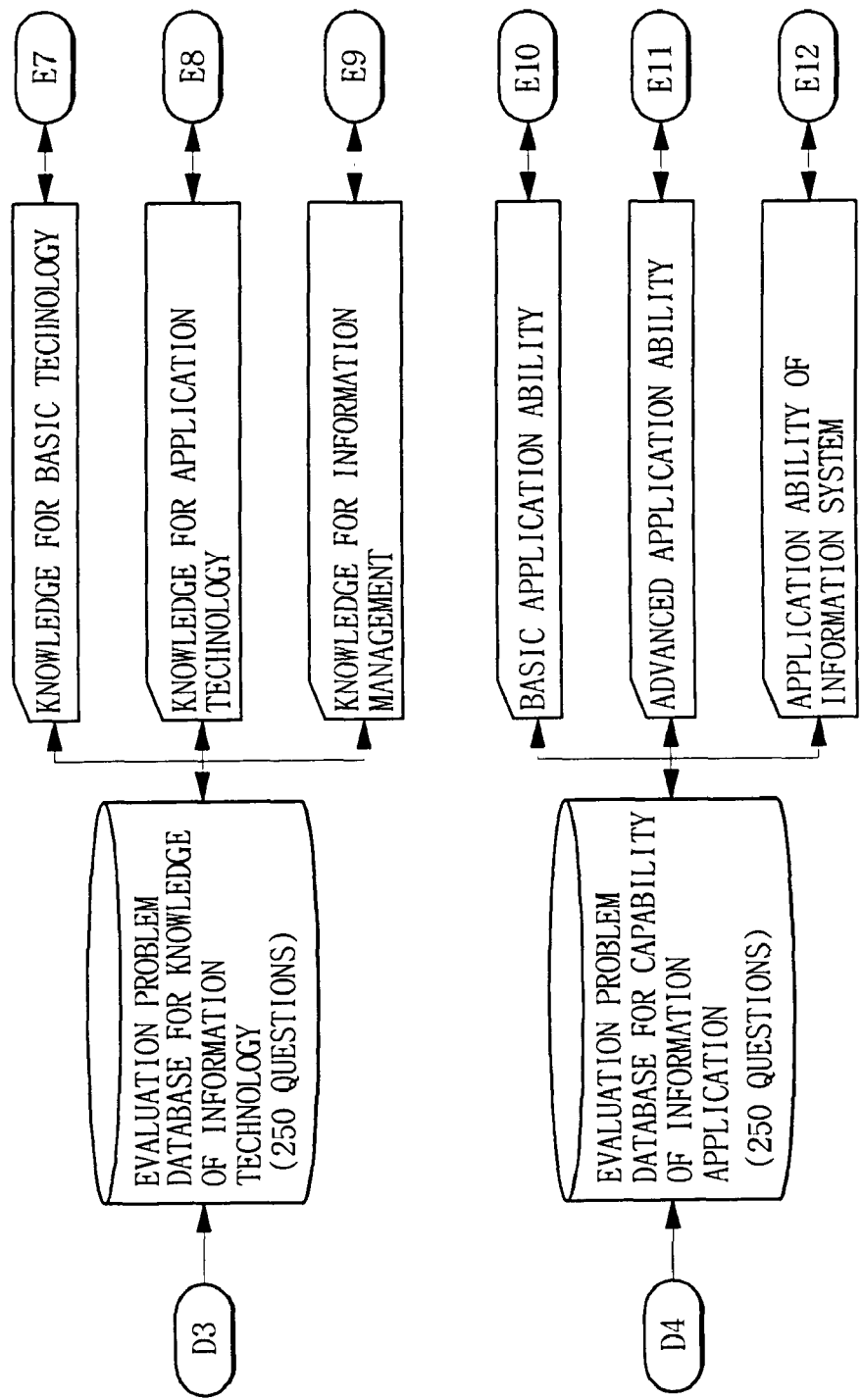
Figure 15D:
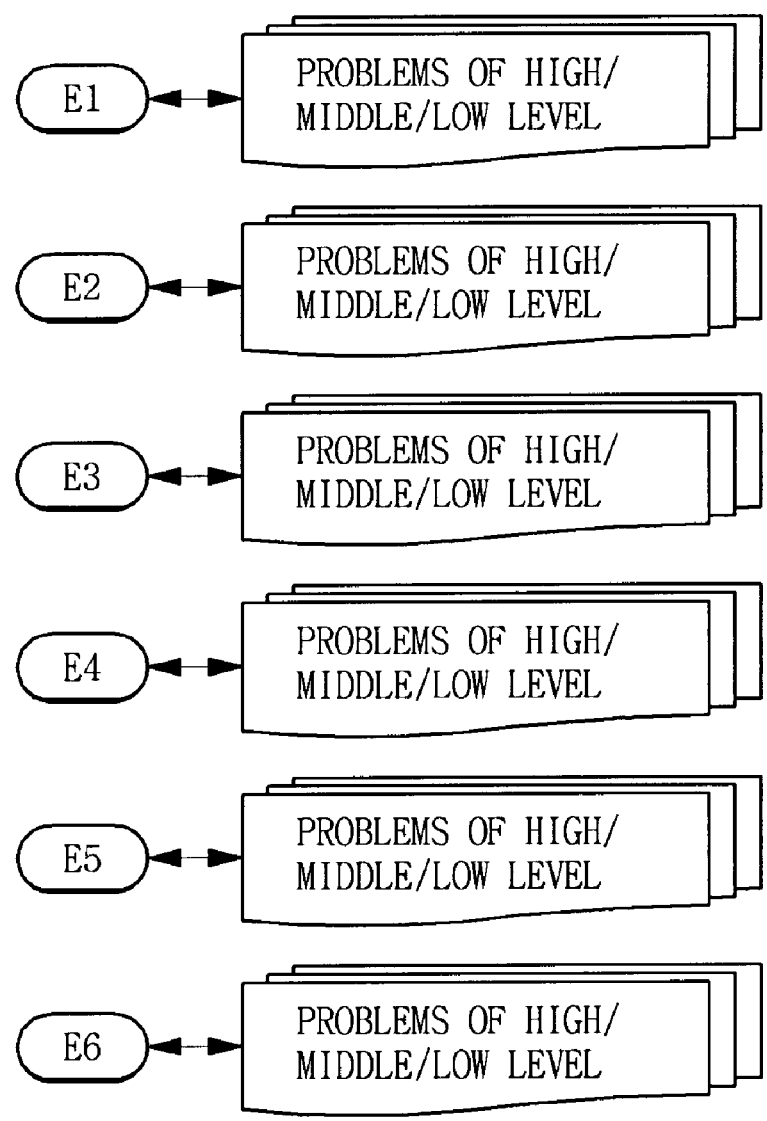
Figure 15E:
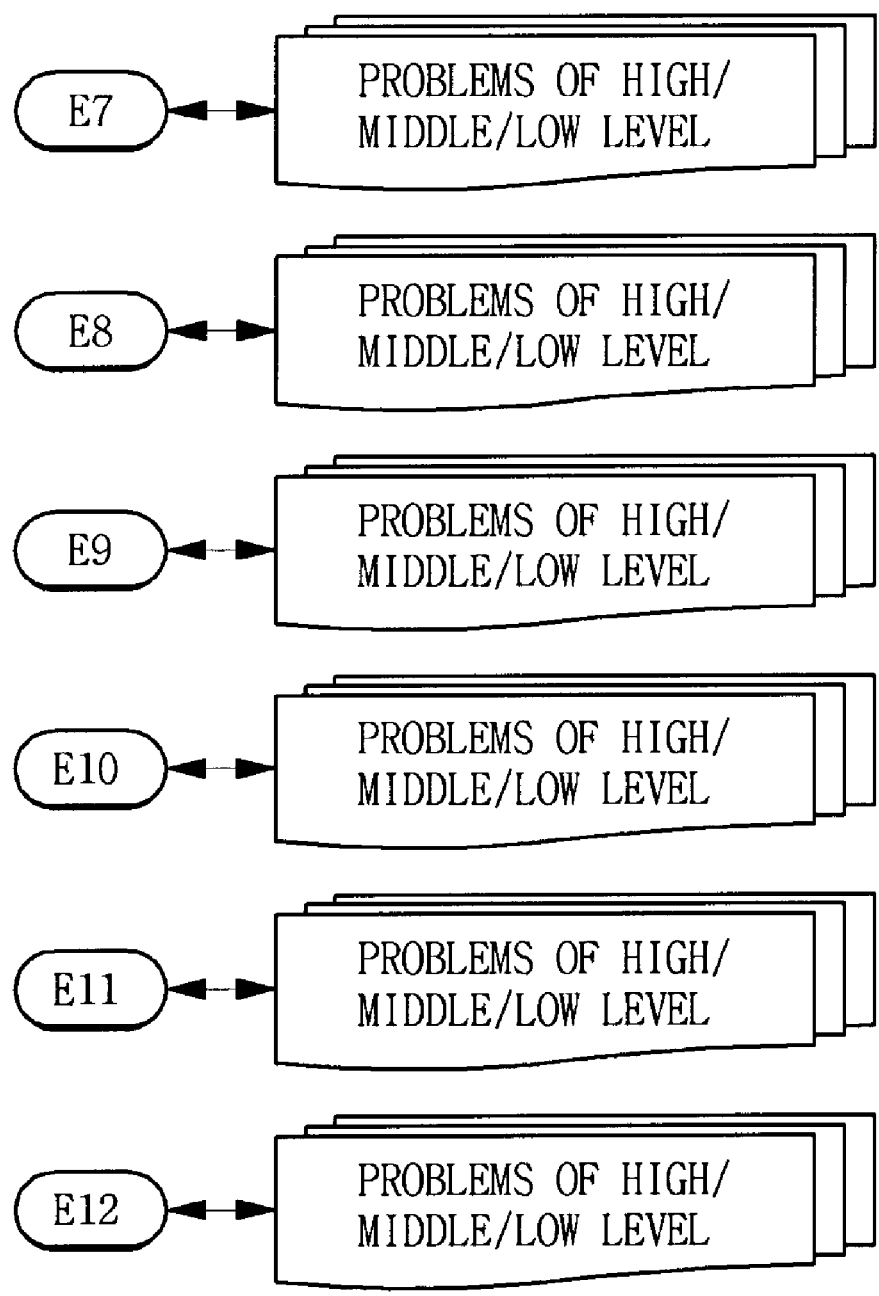

FIG. 14 is a flowchart illustrating a method of estimating an information competency evaluation index performed by the information competency evaluation system 100 according to an embodiment of the present invention.

Referring to FIG. 14, when the evaluation request is received from the evaluation target via the terminal 200 (S200), the information competency evaluation server 130 selects the evaluation group of the evaluation target according to the information maturity model (S201).

Here, there may be several methods in which the information competency evaluation server 130 selects the evaluation group. When the evaluation target directly inputs the business department and the business position through the terminal 200 when requesting the evaluation, the information competency evaluation server 130 can select the evaluation group according to the information on the input business department and business position. On the contrary, when the evaluation target inputs only the identification information such as ID or identification number when the evaluation requests the evaluation, the information competency evaluation server 130 reads information corresponding to the corresponding identification information from the personal information database 150 and can select the evaluation group using the information. In a case of the latter, the information competency evaluation server 130 reads only the information on the business department and the business position of the evaluation group from the personal information database 150 and selects the evaluation group based on the read information, or stores the information on the evaluation group when designing the system and reads the stored information as it is and uses the same.

In this embodiment, the evaluation groups are classified into a CEO, directors, middle managers, and workers, and the business position except for the CEO are classified into strategy plan, development and management, business application, and administration support by the business departments to define total 13 evaluation groups.

When the evaluation group is selected, the information competency evaluation server 130 reads the evaluation problems corresponding to the selected evaluation group from the evaluation model database 110 and delivers the evaluation problems to the terminal 200 (S202). The information competency evaluation server 130 classifies the evaluation problems into the information mind, potential of information capability, knowledge of information technology, and capability of utilizing provided information, and differently provides the evaluation problems according to the evaluation domains. In other words, the information mind and the potential of information capability are provided in the form of a questionnaire, the knowledge of information technology is provided in the form of written evaluation problems, and the capability of information application is provided in the form of practical evaluation problems.

FIG. 15 is a view illustrating an example of the evaluation problems according to the embodiment of the present invention.

Referring to FIG. 15, the evaluation problems are classified into four evaluation domains so that the evaluation problem database has total 1,000 questions with every 250 questions by the evaluation domains. The evaluation problems are classified into high, middle, and basic problems by the difficulty of the evaluation problems for the evaluation elements to store and manage, and the evaluation problems considering the corresponding evaluation domains and the difficulties of the evaluation elements are made by considering the business department and the business position of the evaluation target as the occasion demands.

When the evaluation problems are provided and the evaluation target responds to the evaluation problems through the terminal 200, the information competency evaluation server 130 executes the evaluation response using the score distribution logic (S203). After that, the information competency evaluation server 130 applies the weight values corresponding to the evaluation elements of the evaluation domains (S204) to extract the evaluation indices of each evaluation domain (S205). After applying the weight values to the evaluation indices of each evaluation domain (S206), the evaluation indices of each evaluation domain are summed up to generate the evaluation index of information competency (S207). Here, the weight values of the evaluation domains used to estimate the evaluation index of information competency are the corresponding weight of the evaluation weight values, and higher weight values are applies in the core evaluation domains. The weight values of the evaluation domains and the information on the core evaluation domains are classified by the evaluation groups in the personal information database 110, and the stored values are read to use.

Figure 16:
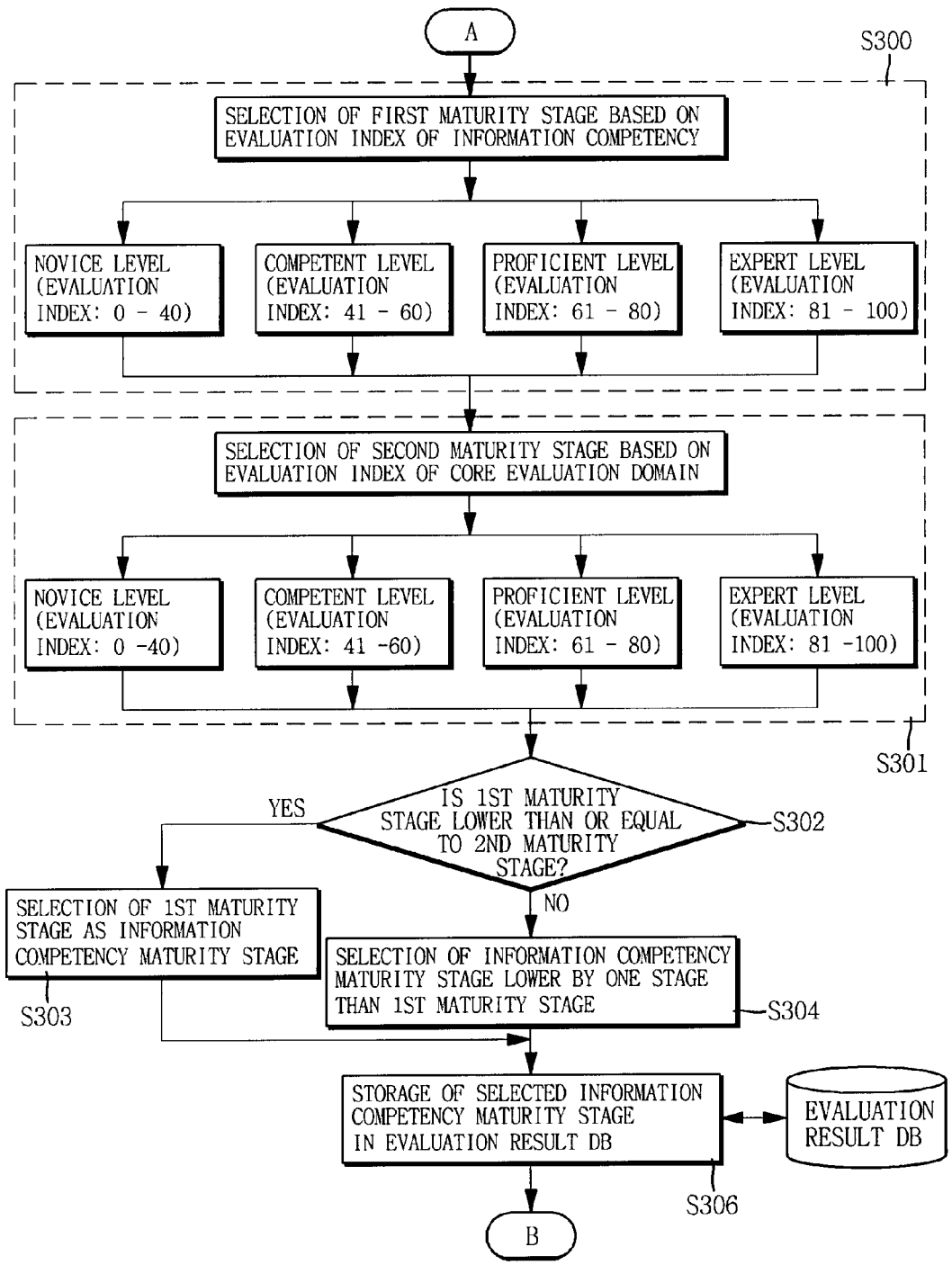
FIG. 16 is a flowchart illustrating a method of selecting an information competency maturity stage according to an embodiment of the present invention.

FIG. 16 is a flowchart illustrating a method of selecting an information competency maturity stage according to the embodiment of the present invention.

Referring to FIG. 16, the information competency maturity evaluation server 140, as described above, selects the first maturity stage corresponding to the evaluation index of information competency from the maturity stages classified into the novice level, the competent level, the proficient level, and the expert level (S300). For example, in a case of representing the evaluation indices of information competency as a range of 0 to 100, the novice level ranges 1 to 40, the competent level ranges 41 to 60, the proficient level ranges 61 to 80, and the expert level ranges 81 to 100.

When the first maturity stage is selected, the information competency maturity evaluation server 140 uses the same method as the method of determining the first maturity stage, and selects the second maturity stage using only the evaluation index corresponding to the core evaluation domain considering the features of business department and business position of the evaluation target (S301).

When the first maturity stage and the second maturity stage are selected, the information competency maturity evaluation server 140 compares the two maturity stages with each other (S302) and determines the first maturity stage as a final information competency maturity stage when the first maturity stage is lower than or equal to the second maturity stage and a maturity stage lower by one level than the first maturity stage as the final maturity stage in another case (S304). After that, the selected information competency maturity stages are stored in the evaluation result database 120.

Figure 17:
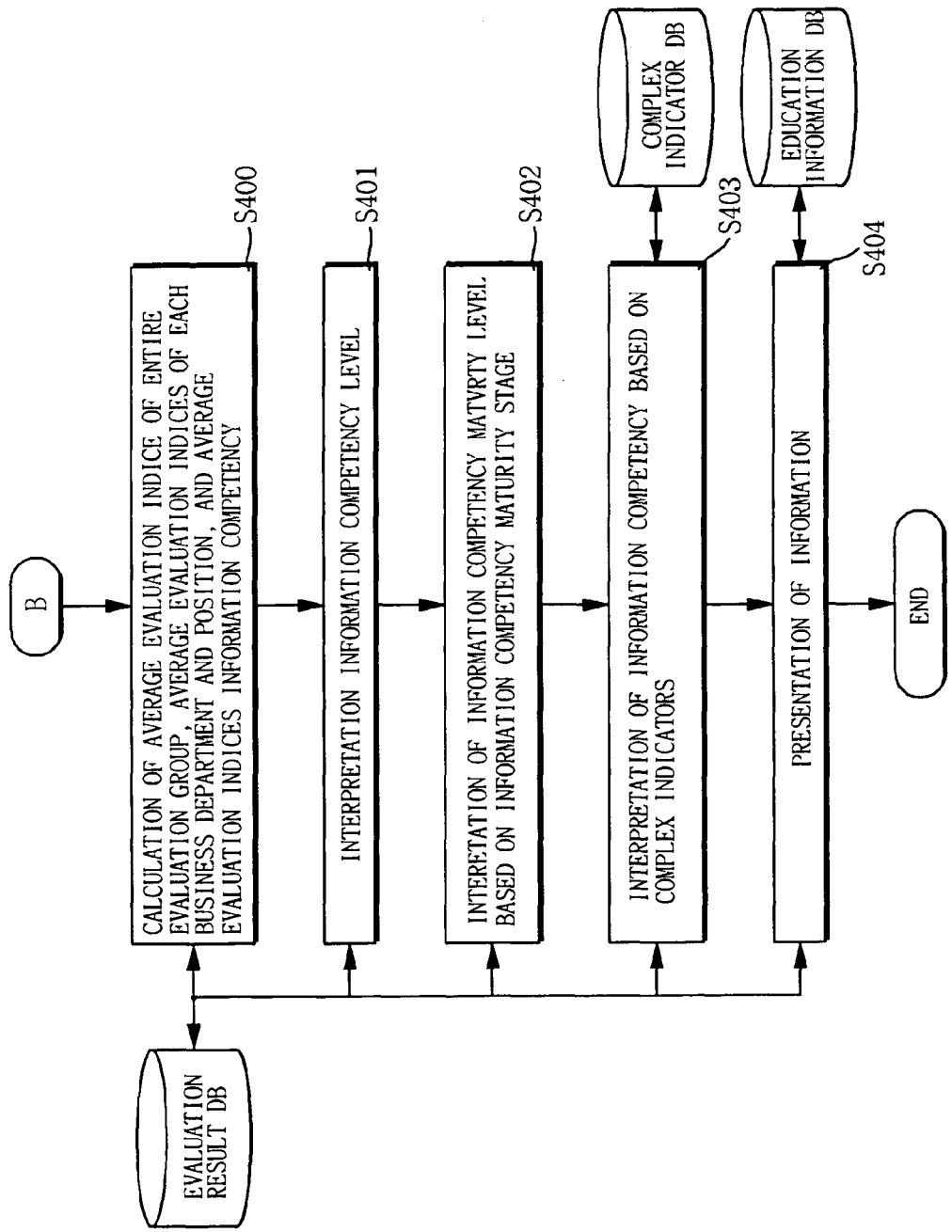
FIG. 17 is a flowchart illustrating a method of analyzing information competency according to an embodiment of the present invention.

FIG. 17 is a flowchart illustrating a method of analyzing information competency according to the embodiment of the present invention.

As illustrated in FIG. 17, the information competency analysis server 160, in order to analyze the level of information competency of the evaluation target, firstly estimates average evaluation indices of the evaluation domains for the entire evaluation groups and average evaluation indices of information competency using the evaluation result (the evaluation indices of the evaluation domains and the evaluation indices of information competency for the evaluation target groups) stored in the evaluation result database 120. The information competency analysis server 160 classifies the evaluation targets of the evaluation target groups by each business department and position to estimate the average evaluation indices of the evaluation domains and the average evaluation indices of information competency (S400). After that, the evaluation indices of the evaluation domains and the evaluation indices of information competency for the evaluation targets are compared with the average evaluation indices of the evaluation domains and the average evaluation indices of information competency for the entire evaluation groups, or with the average evaluation indices of the evaluation domains and the average evaluation indices of information competency for the evaluation group with same business department and position to analyze the levels of information competency of the evaluation targets, and the interpreted results are outputted to the terminals 200 of the evaluation targets together with the evaluation indices of the evaluation domains and the evaluation indices of information competency for the evaluation targets in the form of graphs or charts (S401).

After that, the information competency analysis server 160 interprets the information competency maturities of the evaluation targets based on the information competency maturity stage to output (S402).

The information competency analysis server 160 reads the complex indicators stored in the complex indicator database 170 and interprets the information competency of the evaluation targets based on the complex indicators to output (S403). To this end, the information competency analysis server 160 classifies and summarizes the evaluation results in which the response of the evaluation target is evaluated by the respective corresponding complex indicators and uses the evaluation results for the interpretation of the information competency of the evaluation targets corresponding to the respective complex indicators. In this case, the information competency analysis server 160 may separately output the results in which the information competency of the evaluation targets is interpreted corresponding to the common complex indicators, and the interpreted results corresponding to the core complex indicators.

When the level of information competency and the information competency maturities for the evaluation targets are interpreted, the information competency analysis server 160 reads the education information necessary for the evaluation targets from the education information database 180 based on the interpreted results to present the same.

Figure 18A:
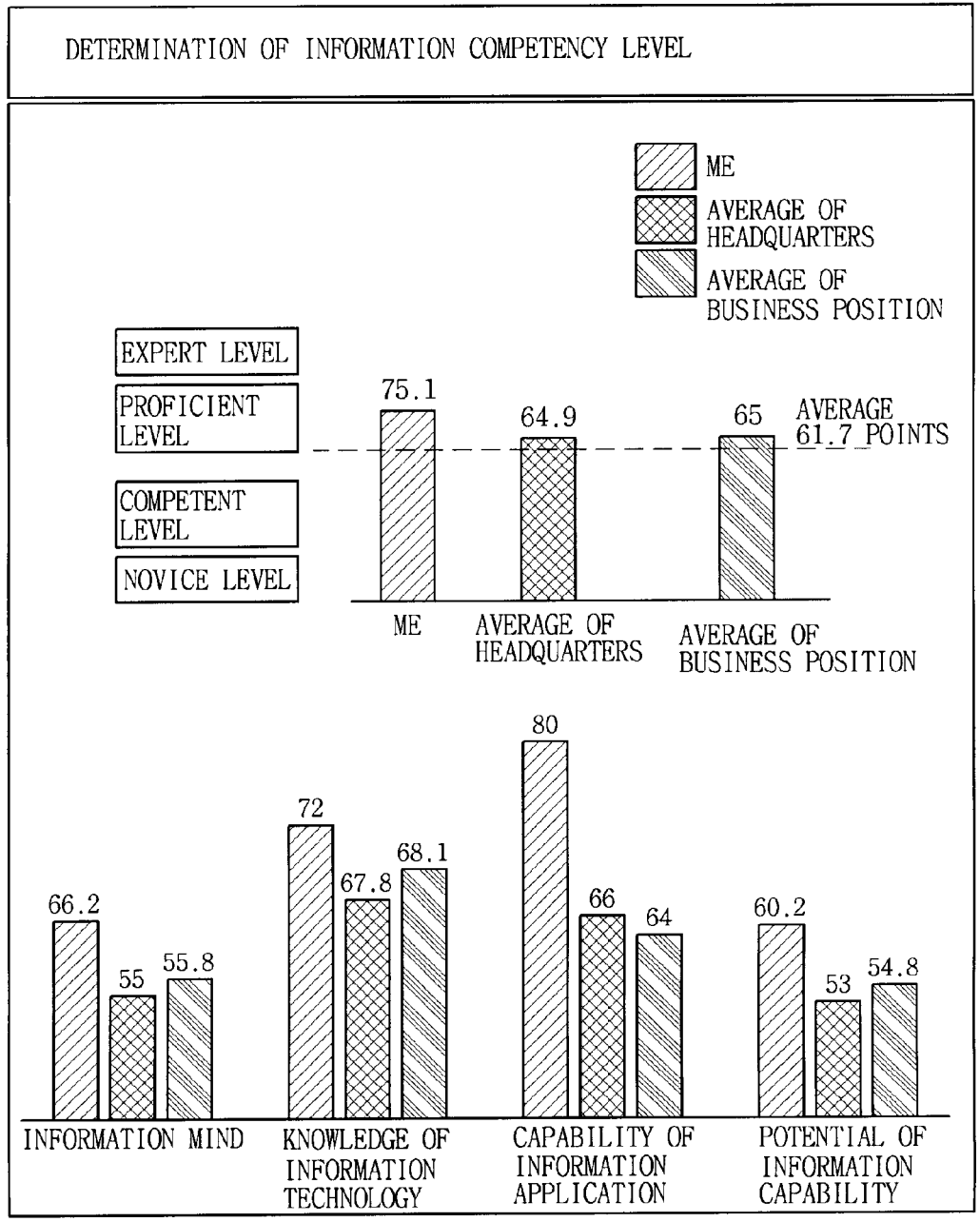
FIG. 18 is a chart illustrating an example in which the system for evaluating information competency according to an embodiment of the present invention outputs an analyzed result of the information competency.
Figure 18C:
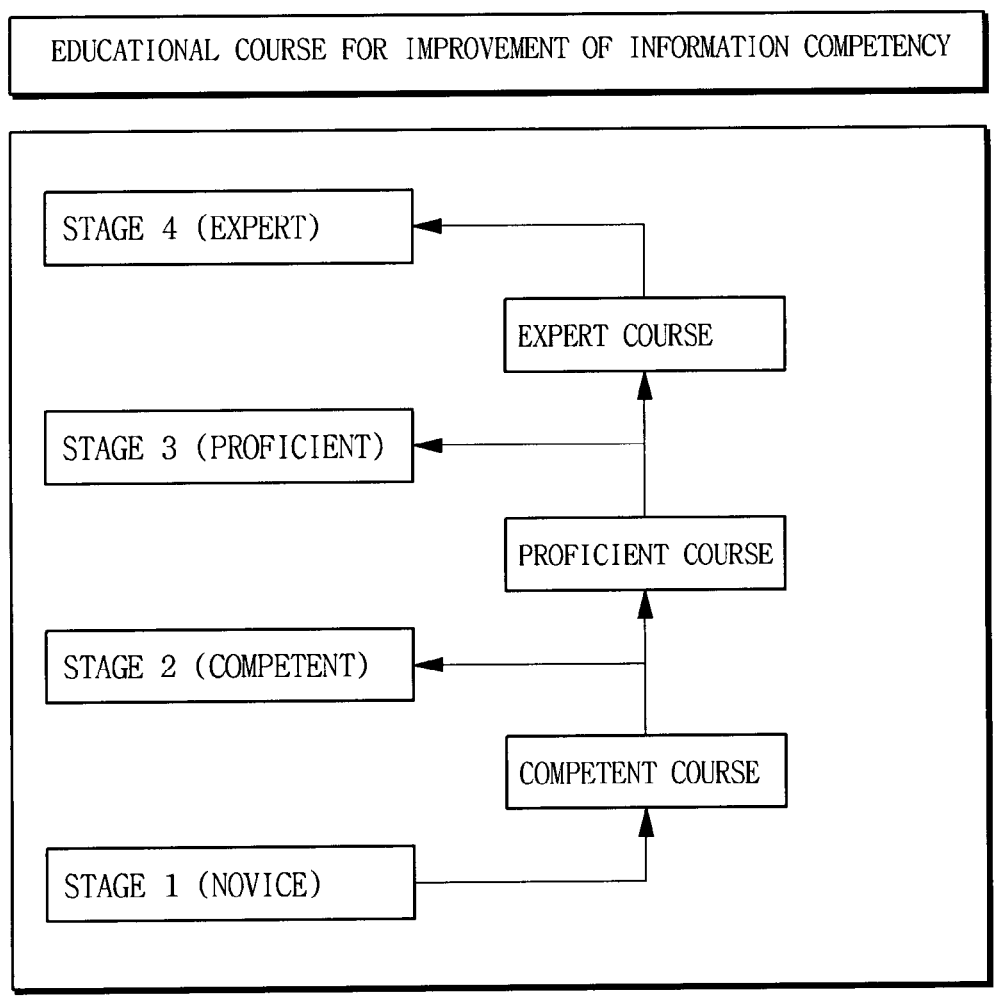

FIG. 18 is a chart illustrating an example in which the system 100 for evaluating information competency outputs the analyzed results of the information competency, the information competency of the evaluation targets are analyzed based on the level of information competency and the maturities of information competency, and the results analyzed based on the complex indicators are separately provided. Moreover, based on them, the education information that is provided is illustrated as an example.

FIG. 18 illustrates the embodiment of the present invention and does not limit the present invention, but the method of providing the analyzed result of the personal information competency to the evaluation target can be modified to be proper to the design of the system. For example, the analyzed result of the level of information competency, provided in the form of a bar chart in FIG. 18A, can be provided in the form of a table.

FIG. 18 illustrates an example of providing the analyzed results of the level of information competency and the information competency maturity for the evaluation target "Gil-dong Hong", wherein the evaluation index of the evaluation domains, the evaluation index of information competency, and the personal information competency maturity stage of "Gil-dong Hong" are provided. FIG. 18 illustrates the result in which the evaluation indices of the respective evaluation domains and the evaluation index of information competency for "Gil-dong Hong" are compared with those of the entire evaluation group and other evaluation targets having the same business department and business position of "Gil-Dong Hong" in the same evaluation target group.

Referring to FIG. 18, since the evaluation index of information competency for "Gil-dong Hong" as the evaluation target is 75.1 and the evaluation index of information competency for the entire evaluation group is 61.7, it can be determined that the evaluation target exhibits a level of information competency higher than that of the evaluation target group. Moreover, since the evaluation index of information competency for other evaluation targets to perform the same task as that of "Gil-dong Hong" in the evaluation target group (Headquarters) is 64.9 and the evaluation index of information competency for other evaluation targets having the same business position in the evaluation target group is 65, the evaluation target exhibits a good level of information competency in both the business department and the business position. The maturity of information competency for "Gil-dong Hong" belongs to the proficient level, and the information competency evaluation system 100 can provide a general diagnosis for the analyzed result with respect to the maturity of information competency of "Gil-dong Hong" as illustrated in the figure.

The information competency evaluation system 100 proposes a suggestion of improving the information competency of the evaluation target based on the estimated personal information competency. In other words, the education information for a short part is provided based on the information competency of the evaluation target analyzed by the evaluation index, the maturity stage, and the complex indicators.

For example, referring to FIG. 18, since the maturity stage of information competency of the evaluation target "Gil-dong Hong" is the proficient level, the evaluation target may be suggested to take an informationization education of the proficient level. Moreover, a theme of the informationization education of the proficient level may be suggested as illustrated at a right central side of FIG. 18D, and, as illustrated at the lower side of FIGS. 18E to 18G, may be suggested as details of the education themes. The information on the educational courses is provided to read educational program information which is classified into the evaluation groups and is stored in the education information database 180 of the information competency evaluation system 100.

As described above, the information competency evaluation system 100 for evaluating, interpreting, and providing the information competency of the evaluation target and the method thereof increase the validity and reliability of the evaluation for the information competency. Moreover, the information competency of the evaluation target is systemically analyzed and is compared with the level of information competency by the business departments and business position of the evaluation target group so that the evaluation result of the evaluation target can be easily understood.

Moreover, a part where the evaluation target further strives for the development of the information competency is clearly suggested and the education information is provided such that evaluation target can systemically plan for the development of the information competency.

The embodiments of the present invention are not achieved by only the above-mentioned system and/or method, but can also be achieved by a program for implementing functions corresponding to the configuration in the embodiments of the present invention and a recording medium in which the program is recorded, and this implementation can be easily carried out from the above description by those skilled in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

According to the embodiments of the present invention, the information competency evaluation system provides the evaluation problems suitable to the features of the business department and business position of the evaluation target, applies higher weight values to the evaluation domains decided to be the core evaluation domains according to the characteristics of the business department and business position of the evaluation target when estimating the evaluation index of information competency so that the validity and reliability for the information competency evaluation can be increased. Moreover, since the evaluation index of information competency for the evaluation target is compared with other evaluation targets in the evaluation target group in various views (in the business department and business position), it can be checked which level of the information competency of the evaluation target is in the evaluation target group to help the understanding of the evaluation result of the evaluation target.

In addition, the maturities of information competency of the evaluation target are defined by levels and are provided to the evaluation target, and the complex indicators of representing the information competency of the evaluation target to show the level of the evaluation target by the respective complex indicators. Therefore, the understanding of the level of information competency of the evaluation target in wide view increases, meaningful and significant information on the level of information competency is provided, a part where the evaluation target must strive for the development of information competency is clearly suggested, and the education information suitable for the evaluation target proper to the maturity stages of information competency is provided for utilization, so that more effective development of the information competency is enabled and the evaluation target can systemically plan for the development of information competency.

Therefore, the information competency of human resources working in an enterprise under an information environment is provided by effectively diagnosing, evaluating, and analyzing the same using the information competency evaluation system of the present invention so that the information competencies of human resources are provided and the effective and systemic development of information competency may be contributed to by the provision of the education information for the effective development of the information competency due to the provided information competency. Moreover, a plan of effectively training human resources for developing a policy of effectively training human resources at the level of country and for improving information competency of human resources of industries and enterprises is established and applied, based on the diagnosis of the level of information competency and the evaluation results for the whole country, industries, and enterprises, so that the information competency evaluation system and the method thereof can contribute the training and use of human resources who effectively carry out tasks in the future informationization environment and can exhibit superior performance.

What is claimed is:

1. An information competency evaluation system connected to a terminal of an evaluation target for evaluating a level of information competency and a maturity of the evaluation target, comprising:
   an evaluation model database to classify and store a plurality of evaluation groups which are classified by business departments and positions and evaluation problems by a plurality of evaluation domains in which components of the information competency are classified by domains;
   an education information database to classify and store education information, corresponding to a plurality of maturity stages, by the evaluation groups;
   an information competency evaluation server to select an evaluation group corresponding to the evaluation target according to a business department and a business position of the evaluation target, to read the evaluation problems corresponding to the selected evaluation group by the evaluation domains from the evaluation model database to provide the same to the terminal, to evaluate evaluation responses that are received from the terminal due to the provision of the evaluation problems to estimate an evaluation result, and to output evaluation indices for the evaluation domains in which weight values of evaluation elements are applied to the evaluation result and evaluation indices of information competency in which weight values of the evaluation domains are applied to the evaluation indices of the evaluation domains;
   an information competency maturity evaluation server to select a first maturity stage corresponding to the evaluation index of information competency and a second maturity stage corresponding to the an evaluation index of a core evaluation domain with higher importance among the evaluation indices from the plurality of maturity stages, to compare the first maturity stage with the second maturity stage, and to select and output the information competency maturity stage of the evaluation target; and
   an information competency analysis server to estimate an average evaluation index of information competency for the entire evaluation groups, an average evaluation index of information competency for the business department, and an average evaluation index of information competency for the business position, to compare the estimated average indices with the evaluation indices of information competency of the evaluation target, to provide an analyzed result, made by the comparison, with the evaluation indices of the evaluation domains, the evaluation indices of information competency, and the information competency maturity stage for the evaluation target to the terminal, and to read the education information corresponding to the information competency maturity stage of the evaluation target from the education information database to provide the read education information to the terminal.

2. The information competency evaluation system according to claim 1, further comprising a personal information database to store business department and business position information of the evaluation target, wherein
   the information competency evaluation server selects an evaluation group corresponding to the evaluation target using the business department and business position information of the evaluation target read from the personal information database.

3. The information competency evaluation system according to claim 1, wherein the information competency evaluation server receives the business department and business position information of the evaluation target from the terminal to select an evaluation group corresponding to the evaluation target.

4. The information competency evaluation system according to claim 1, further comprising a complex indicator database to store a plurality of complex indicators which contains items to be evaluation indicators of information competency, wherein
   the information competency analysis server reads the evaluation results from the information competency evaluation server, and provides an information competency analyzed result of the complex indicators of the evaluation target, in which the evaluation result is analyzed to correspond to the complex indicators read from the complex indicator database, to the terminal.

5. The information competency evaluation system according to claim 1, wherein the information competency evaluation server selects the core evaluation domain from the evaluation domains according to the business department and the business position of the evaluation target.

6. The information competency evaluation system according to claim 5, wherein the weight values of the evaluation domains are set high as the evaluation domains have high importance according to the business department and the business position of the evaluation target, and the weight values of the core evaluation domain is set higher than weight of other evaluation domains.

7. The information competency evaluation system according to claim 4, wherein the evaluation domains are classified into an information mind, knowledge of information technology, capability of information application, and potential of information capability.

8. The information competency evaluation system according to claim 7, wherein the information competency evaluation server differently selects a method of providing the evaluation problems for the evaluation domains, provides the evaluation problems corresponding to the information mind and the potential of information capability in the form of a questionnaire, provides the evaluation problems corresponding to the knowledge of information technology in the form of written evaluation problems, and provides the evaluation problems corresponding to the capability of information application in the form of practical evaluation problems.

9. The information competency evaluation system according to claim 4, wherein the information competency analysis server comprises:
   an interpretation unit of information competency level to output a result of analyzing a level of information competency of the evaluation target by the business department and the business position using the evaluation indices of information competency to the terminal;
   an interpretation unit of information competency maturity level to output a result of analyzing the maturity of information competency of the evaluation target using the maturity stage of information competency to the terminal;

an interpretation unit of complex indicator to analyze and output the information competency of the evaluation target by the complex indicators, read from the complex indicator database, using the evaluation result; and an education information provider to read education information necessary for the evaluation target from the education information database using the information competency maturity stages and provide the education information to the terminal.

10. The information competency evaluation system according to claim 9, wherein the interpretation unit of information competency level compares an evaluation index of information competency with an average evaluation index of information competency for the entire evaluation groups, an average evaluation index of information competency of members in the evaluation target group who perform the same task as that of the evaluation target, and an average evaluation index of information competency of members in the evaluation target group with the same business position as that of the evaluation target, and provides the compared result to the terminal.

11. The information competency evaluation system according to claim 10, further comprising an evaluation result database to store the evaluation results, the evaluation indices of the evaluation domains, and the evaluation indices of information competency of the members belonging to the evaluation target group, wherein the interpretation unit of information competency level reads the evaluation indices of the evaluation domains and the evaluation indices of information competency of the members belonging to the evaluation target group from the evaluation result database, and estimates an average evaluation index of information competency of the entire evaluation group, an average evaluation index of information competency of the members in the evaluation target group who perform the same task as that of the evaluation target, and an average evaluation index of information competency of the members in the evaluation target group with the same business position as that of the evaluation target.

* * * * *